US011983297B2

(12) United States Patent
Tutuianu et al.

(10) Patent No.: US 11,983,297 B2
(45) Date of Patent: May 14, 2024

(54) EFFICIENT STATISTICAL TECHNIQUES FOR DETECTING SENSITIVE DATA

(71) Applicant: Amazon Technologies, Inc., Seattle, WA (US)

(72) Inventors: Aurelian Tutuianu, Iasi (RO); Daniel Voinea, Iasi (RO); Petru-Serban Cehan, Iasi (RO); Silviu Catalin Poede, Iasi (RO); Adrian Cadar, Iasi (RO); Marian-Razvan Udrea, Iasi (RO); Brent Gregory, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/157,024

(22) Filed: Jan. 19, 2023

(65) Prior Publication Data

US 2023/0153462 A1    May 18, 2023

Related U.S. Application Data

(63) Continuation of application No. 16/990,809, filed on Aug. 11, 2020, now Pat. No. 11,599,667.

(51) Int. Cl.
*G06N 20/00* (2019.01)
*G06F 16/2458* (2019.01)
*G06F 16/29* (2019.01)
*G06F 21/62* (2013.01)
*G06N 5/04* (2023.01)

(52) U.S. Cl.
CPC ...... *G06F 21/6245* (2013.01); *G06F 16/2462* (2019.01); *G06F 16/29* (2019.01); *G06N 5/04* (2013.01); *G06N 20/00* (2019.01)

(58) Field of Classification Search
None
See application file for complete search history.

(56) References Cited

U.S. PATENT DOCUMENTS

| | | |
|---|---|---|
| 9,015,802 B1 | 4/2015 | Muthusrinivasan et al. |
| 9,317,715 B2 | 4/2016 | Schuette et al. |
| 9,807,061 B2 | 10/2017 | Hughes et al. |
| 10,593,004 B2 | 3/2020 | Gottschalk, Jr. et al. |

(Continued)

OTHER PUBLICATIONS

Octavian-Eugen Ganea, et al., "Deep Joint Entity Disambiguation with Local Neural Attention", arXiv:1704.04920v3, Jul. 31, 2017, pp. 1-12.

(Continued)

*Primary Examiner* — Cai Y Chen
(74) *Attorney, Agent, or Firm* — Robert C. Kowert; Kowert, Hood, Munyon, Rankin & Goetzel, P.C.

(57) ABSTRACT

A candidate attribute combination of a first data set is identified, such that the candidate attribute combination meets a data type similarity criterion with respect to a collection of data types of sensitive information for which the first data set is to be analyzed. A collection of input features is generated for a machine learning model from the candidate attribute combination, including at least one feature indicative of a statistical relationship between the values of the candidate attribute combination and a second data set. An indication of a predicted probability of a presence of sensitive information in the first data set is obtained using the machine learning model.

20 Claims, 10 Drawing Sheets

(56) References Cited

U.S. PATENT DOCUMENTS

| | | | | |
|---|---|---|---|---|
| 2016/0189186 A1* | 6/2016 | Fabrikant | ........... | G06Q 30/0205 705/7.34 |
| 2019/0052614 A1 | 2/2019 | Versteeg et al. | | |
| 2019/0357010 A1* | 11/2019 | Ali | .................... | H04M 3/42382 |

OTHER PUBLICATIONS

Jonathan Raiman, et al., "DeepType: Multilingual Entity Linking by Neural Type System Evolution", The Thirty-Second AAA1 Conference on Artificial Intelligence (AAAI-18), AAAI, 2018, pp. 5406-5413.

Avirup Sil, et al., "Neural Cross-Lingual Entity Linking", The Thirty-Second AAA1 Conference on Artificial Intelligence (AAA1-18), AAAI, 2018, pp. 5464-5472.

Priya Radhakrishnan, et al., "ELDEN: Improved Entity Linking using Densified Knowledge Graphs", In Proceedings of the 2018 Conference of the North American Chapter of the Association for Computational Linguistics: Human Language Technologies, vol. 1 (Long Papers), pp. 1844-1853.

Johannes Hoffart, et al., "Robust Disambiguation of Names Entities in Text", in Proceedings of the 2011 Conference on Empirical Methods in Natural Language Processing, Jul. 21-31, 2011, pp. 782-792.

Ana Justel, et al., "A Multivariate Kolmogorov-Smirnov Test of Goodness of Fit", Working Paper, Statistics and Econometrics Series 13, Sep. 1994, Departamento de Estadistica y Econometria, Universidad Carlos III de Madrid, pp. 1-16.

J.A. Peacock, "Two-dimensional goodness-of-fit testing in astronomy", Royal Astronomical Society, Provided by the NASA Astrophysics Data System, 202, 1983, pp. 615-627.

Klaus Abberger, "Smoothing ordered sparse contingency tables and the x2 Test", University of Konstanz, Germany, 2002, pp. 1-9.

AWS, "AWS Security Best Practices—AWS Whitepaper", Aug. 1, 2016, pp. 1-67.

AWS, "Amazon Macie User Guide", Document updated Jun. 22, 2020, pp. 1-55.

\* cited by examiner

EFFICIENT STATISTICAL TECHNIQUES FOR DETECTING SENSITIVE DATA

This application is a continuation of U.S. patent application Ser. No. 16/990,809, filed Aug. 11, 2020, which is hereby incorporated by reference herein in its entirety.

BACKGROUND

Ensuring the trustworthiness and security of the data being used for computer-based applications has become a growing concern in recent years as the sophistication of network-based attack mechanisms has increased. Hardware and software engineers keep enhancing the built-in safety mechanisms of computer systems, while attackers keep discovering new avenues for penetrating the defenses designed by the engineers. Further complicating the security problem, more and more computer-based applications are being run on network-accessible resources that can be shared among multiple users, which can potentially provide additional opportunities for various types of security breaches. To help ensure the security of customer data, regulations similar to the General Data Protection Regulation (GDPR) are now in force in numerous jurisdictions.

Many companies and other organizations operate computer networks that interconnect numerous computing systems to support their operations, such as with the computing systems being located in multiple distinct geographical locations (e.g., connected via one or more intermediate networks). Data centers housing significant numbers of interconnected computing systems, some of which may potentially be used to store sensitive data inadvertently or deliberately, have become commonplace, including public data centers of provider networks that are operated by entities as businesses to provide computing and storage resources to customers. Some public data center operators provide network access, power, and secure installation facilities for hardware owned by various customers, while other public data center operators provide "full service" facilities that also include hardware resources made available for use by multiple customers.

The rate at which data is generated and stored at provider networks or cloud computing environments continues to grow rapidly. Detecting whether a given collection of data stored at a provider network includes sensitive information (such as various types of personally identifiable information (PII)) for which special treatment may be required based on the organizational policies and/or privacy regulations in effect remains a non-trivial technical problem.

Figure 1:
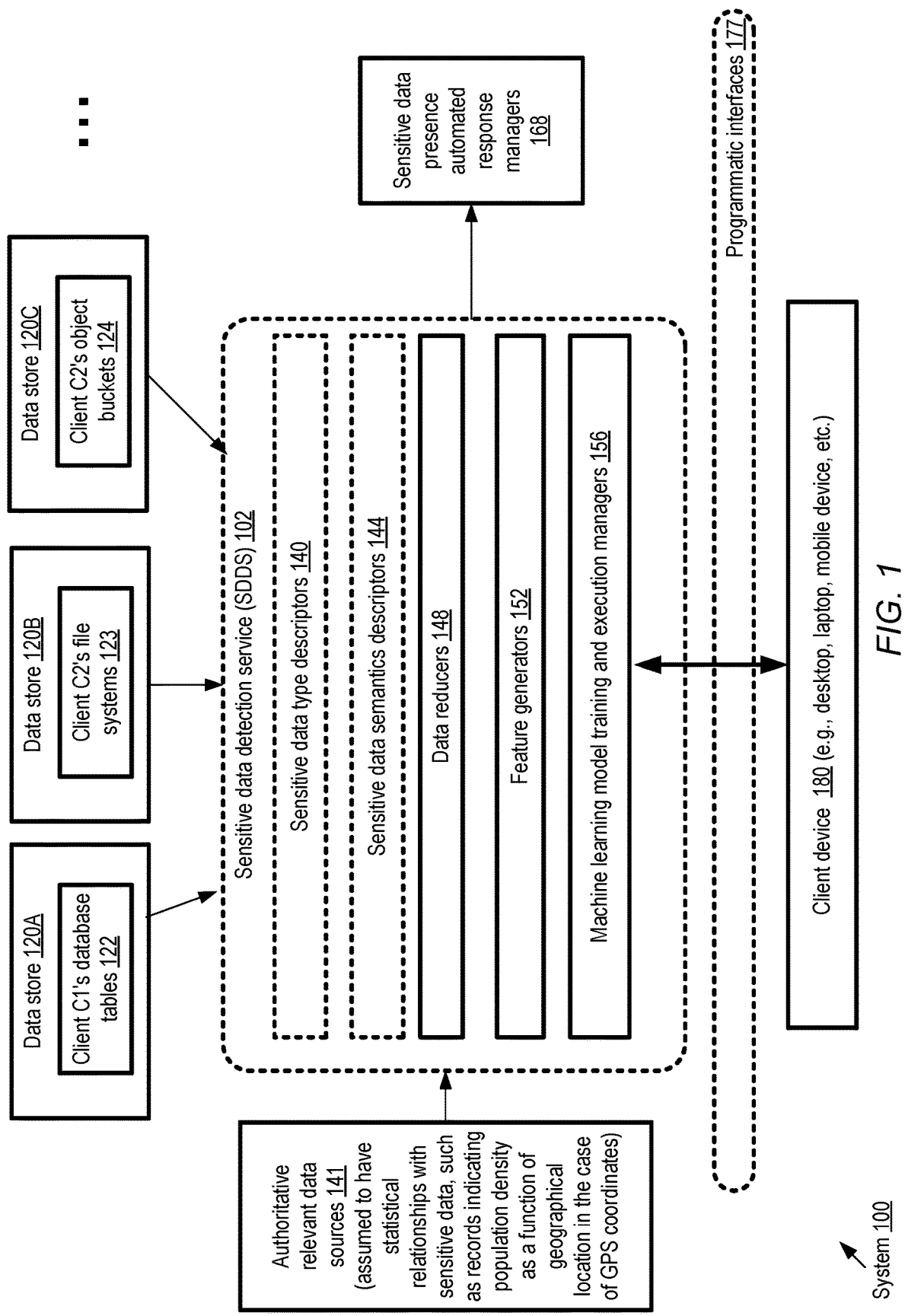
FIG. 1 illustrates an example system environment in which efficient statistical techniques for detection of the presence of sensitive data within data sets may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficiently detecting the presence of sensitive data within large data sets using statistical techniques. The target data sets for which sensitive data presence analysis is to be conducted may, for example, be stored at database services or other storage-related services of a provider network or cloud computing environment. Classifying data sets (or entire data stores such as database instances, buckets of storage objects, etc.) into one of two groups: (a) sensitive-data-containing data sets or (b) sensitive-data-less data sets may be a requirement for compliance with various privacy related regulations and policies (such as internal policies of the storage provider) in at least some embodiments. A target data set may comprise numerous storage objects such as database tables, files, and the like which collectively contain many terabytes of data, so examining all the contents of all the data objects may be impractical. Furthermore, privacy requirements may also require that the analysis of the data sets be performed within secure environments, such that the chances of leakage or loss of sensitive data (if it exists in the analyzed data) are reduced.

Simply examining the syntax of the individual values stored within target data sets may be insufficient to detect sensitive data; for example, a 4-digit integer such as 1234 may represent a year, a 4-digit component of a credit card number, a client identifier, and so on. Instead, statistical techniques that perform analyses at the population level, rather than only at the individual instance level, may be employed in various embodiments. The proposed population-based inference techniques utilize assumptions about statistical relationships between authoritative external data sets (i.e., data other than the target data sets) and one or more types of sensitive data to generate feature sets which can be provided as input to machine learning models. The output produced by the models may indicate the probabilities of the presence of sensitive data within the target data sets represented by the feature sets. The feature sets may be generated after obfuscating or transforming the raw contents of the target data sets; as a result, the privacy/security requirements of the target data sets are not violated. The problem of dealing with very large target data sets may be addressed by intelligent reduction of the target data sets, using the hierarchical arrangement or topology of the target data sets as well as semantics of the sensitive data types to reduce the amount of data which has to be analyzed. Relatively simple machine learning models, such as logistic regression models, may be employed in some embodiments to enable rapid training and fast execution. Using the proposed techniques, the presence of sensitive data in plain text or numeric form within extremely large target data sets may be detected using relatively small amounts of computing and storage resources in various embodiments. If and when the predicted probability of the presence of sensitive data within a target data set exceeds a threshold, responsive actions of various types may be quickly undertaken—e.g., individuals or entities on whose behalf the target data sets are stored may be informed regarding the probability, automated security enhancement techniques with respect to the sensitive data may be initiated, and so on.

Consider an example scenario in which a large data set is stored at a storage service on behalf of a data owner, and a sensitive data analysis tool or service employing the above techniques predicts that the probability of presence of sensitive data within the large data set is higher than some threshold. This prediction may then trigger an automated resolution workflow in some embodiments: for example, the data owner may be informed about the prediction automatically (e.g., via one or more messages in which the predicted probability is indicated, as well as the subset(s) of the large data set for which the predicted probability was generated), the data owner may choose a sensitive data handling policy to be enforced (e.g., an encryption policy, or a policy that results in the isolation or deletion of the sensitive data) if the data owner confirms that the sensitive data is actually present, and so on. In some embodiments, a repository of attestation records may be maintained (e.g., to help comply with privacy regulations or policies), in which various interested parties such as the data owners, administrators of storage services, administrators of the sensitive data analysis tools and the like can store information about data sets in which sensitive data is suspected/inferred to exist, actions/workflows initiated based on such suspicions/inferences, confirmations/rejections of such suspicions/inferences by the data owners, and so on. Note that such confirmations/rejections may be used in some embodiments to identify new labeled training data which can be used to re-train and improve the machine learning model over time. In at least one embodiment, a data owner may specify, in advance of the analysis of their data sets, automated actions to be taken or policies to be enforced automatically if the probability of presence of sensitive exceeds a threshold, such as (a) encrypting the suspected sensitive data (b) copying the suspected sensitive data to an isolated storage environment, (c) changing access permissions on the suspected sensitive data or performing other access-related administrative operations and/or (d) deleting the suspected sensitive data. In one embodiment, a data owner may specify different policies for different probability thresholds—e.g., one policy may be specified for cases in which the probability that a data set contains sensitive information data exceeds 90%, another policy may be specified for cases in which the probability lies between 60% and 90%, and so on.

It may be useful to provide a concrete example to explain the use of external data sets for detecting sensitive information. The geographical locations of individuals, e.g., expressed as Global Positioning System (GPS) coordinates, represents one category of sensitive personal data (also referred to in some embodiments as personally identifiable information or PII). As a person moves around, e.g., with a device such as a mobile phone, it may be possible for various applications running on the device (as well as external sensors/cameras) to record the GPS coordinates of the person at various temporal granularities with the person's permission. If the person's GPS coordinates are stored without transformation/obfuscation (e.g., as a pair of human-readable floating point numbers representing latitude and longitude respectively, or as a triple of human-readable floating point numbers representing latitude, longitude and elevation above sea level) within a data object, this may represent a scenario in which the storage of sensitive personal information is potentially problematic. Detecting the presence of such un-transformed GPS information may thus be extremely desirable to help satisfy security and privacy policies and regulations. However, the presence of respective floating point numbers within two or more attributes or columns of a structured data object (such as a database table, a spreadsheet-like delimited file, etc.) is very common; a pair of such attributes may for example represent weights and prices of items of a catalog, which is very different from GPS coordinates. Thus simply enforcing a rule that if two attributes of a structured data object contain floating point values, the object must be flagged as potentially containing sensitive GPS information would not be very useful, as it could potentially lead to extremely high rates of false positives with respect to classifying data sets as sensitive-data-containing. Furthermore, even the existence of GPS coordinate information within a target data set does not necessarily mean that those GPS coordinates reveal sensitive personal information: for example, the GPS coordinates may simply indicate the locations of inanimate objects such as environmental sensors, which is typically not considered sensitive information.

The following assumption about statistical relationships of GPS data within target data sets and human population density datasets (an example of an external dataset with respect to the target data sets) may be used to help overcome the problem of detecting whether pairs or triples of floating point numbers actually represent GPS coordinates in at least some embodiments. The assumption is that if a particular set of values of a target data set actually represents GPS coordinates of human beings' locations, the statistical distribution of those values would be at least somewhat similar to (i.e., at least somewhat correlated with) the distribution of human population as a function of location. That is, there should be (generally speaking) more values of the "candidate" GPS data points representing human beings in places where there are (generally speaking) more human beings typically present. The human population density information may be available from a variety of trusted or authoritative sources in different embodiments, e.g., from census bureaus, government departments and the like. Assume further, for the purposes of this discussion that we are only interested in GPS coordinates expressed as a pair of floating point values (for latitude and longitude). If the sets of candidate floating point value pairs of a pair of attributes (Attr1, Attr2) of a target data set are mapped to a two-dimensional grid, with each cell of the grid representing a region corresponding to a selected range of latitude and a selected range of longitude, and if each cell were then assigned a count equal to the number of distinct pairs of floating point values among the (Attr1, Attr2) pairs that lie within that latitude and longitude range, we would obtain an indication of the geographical distribution of the candidate attribute pair values. This geographical distribution of the candidate floating point (Attr1, Attr2) value pairs could then be compared with the geographical distribution of human population density; if there is a reasonable degree of similarity or correlation in the distributions, the probability that the candidate floating point values actually represent GPS coordinates would be higher than if there is less similarity. Note that the proposed technique may be able to discriminate not just between GPS coordinates and other types of floating point data, but also between GPS coordinates of the human population (which would be considered sensitive information despite being gathered with the permission of the individuals involved) versus GPS coordinates of objects such as weather stations and the like (which would probably not be considered sensitive information as mentioned above).

This type of intuition regarding human population density and GPS coordinates represents just one example of the use of external datasets to predict probabilities of the presence of sensitive data. Other types of external datasets (which are also referred to as "prior" datasets or non-target datasets) than human population density distributions may be used for detecting the presence of other types of sensitive data in various embodiments. For example, for detecting whether certain types of sensitive numeric identifiers (such as client account numbers or phone numbers) are present in a target data set, the external or prior datasets may include distributions of the ranges of the numeric identifiers in a real-world collection of the identifiers, distributions of hash values obtained via certain hash functions from the real-world numeric identifiers, and so on.

In at least some embodiments, sensitive personal information may represent just one type of information whose detection may be targeted using the efficient statistical techniques introduced above; the techniques may be applied with equal success to other types of targeted information which may not necessarily be considered sensitive. For example, consider a scenario in which an organization stores a very large data set at a storage service. Different authorized parties (e.g., employees of the organization, or external partners of the organization) may periodically extract some data subsets of the very large data set, perform some transformations on a part of the extracted data, and then add the transformed version back to the storage service. Assume also that the pre-transformed data contains records with some fields or attributes which can be used as logical identifiers or classifiers of the records, and the post-transformation data retains these identifying/classifying fields or attributes in unmodified form. The statistical approaches introduced herein may make it possible to track the flow of data in such a scenario, with the identifying/classifying fields being considered the targeted information, even though such fields may not necessarily represent sensitive information pertaining to privacy policies or regulations. By enabling linking of the pre-transformation versions with the post-transformation versions, and enabling detection of chains of such links, the proposed techniques may allow owners of the data sets to obtain a clearer understanding of the manner in which the storage is being used, how data is flowing between different parts of the overall storage environment, and so on. Although sensitive personal information is used as the primary example of the kinds of information whose presence is detected using the described statistical techniques in much of the following description, the statistical techniques are not limited to detecting any particular kind of information. The term "targeted information" as used herein may refer generally to all the different types of information whose presence can be detected using the proposed statistical approaches in various embodiments, including both sensitive and non-sensitive information.

As one skilled in the art will appreciate in light of this disclosure, certain embodiments may be capable of achieving various advantages, including some or all of the following: (a) substantially reducing the amount of computation, storage and networking resources required to detect the presence of sensitive information within target data stores and to comply with privacy protection regulations and policies, while filtering out cases of non-sensitive information with structural similarities with respect to the sensitive information (as in the weather station GPS information example mentioned above), (b) enhancing the security of data stored at cloud computing environments or other large-scale data storage facilities, e.g., by quickly initiating actions to secure or protect data which may have inadvertently been stored in human-readable form, (c) improving the user experience of administrators or owners of data sets, e.g., by providing the names or identifiers of specific columns or attributes of structured records (or clusters of unstructured records whose common/shared structure has been inferred) which have been found to have a high probability of containing sensitive data, without requiring the administrators or owners to search through data stores for the columns or attributes and/or (d) enabling owners or administrators of large storage environments to obtain insights into the flow of data within the environments, logical links between different parts of the storage environments, storage resource usage patterns, and so on.

According to some embodiments, a system may comprise one or more computing devices. The computing devices may include instructions that upon execution on or across the one or more computing devices cause the one or more computing devices to obtain a first data set indicating human population density as a function of geographical location. The computing devices may identify a plurality of structured data objects of a data store to be analyzed for a presence of geographical location details pertaining to individuals. The geographical location details may be expressed using a plurality of numeric data types (such as floating point numbers in the case of GPS coordinates). Individual ones of the structured data objects may comprise a plurality of records, and individual ones of the records may comprise values of a plurality of attributes.

A sample of records may be collected from a particular structured data object in various embodiments. One or more candidate attribute combinations (e.g., pairs of attributes, triplets of attributes or n-tuples of attributes with n>1) may be identified from among the plurality of attributes of the sampled records in some embodiments, such that at least the following conditions hold. According to the first condition, individual ones of the identified candidate attribute combinations may be required to meet a data type similarity criterion with respect to the plurality of numeric data types of the geographical location details. For example, if the geographical location details require two floating point values, attribute pairs whose elements comprise or indicate floating point values may be selected. According to the second condition, attribute values of the identified candidate attribute combinations may be required to satisfy semantic filtration criteria associated with the geographical location details—e.g., only those pairs of attribute columns which contain valid latitude/longitude values in both columns within a given record may be identified as candidates for further analysis, because the semantics of human location GPS values in the real world are such that the latitude and longitude tend to be recorded together (records containing only latitude or only longitude are thus semantically unlikely).

Corresponding to individual ones of the candidate attribute combinations and the first data set, a collection of input features may be generated for a classification model, including at least one feature indicative of a statistical relationship between human population density and attribute values of the candidate attribute combinations in at least some embodiments. A probability of a presence of geographical location details may be obtained from the classification model in various embodiments, and transmitted to one or more destinations.

According to at least some embodiments, the input features provided to the machine learning model may be generated using obfuscated versions of the raw attribute values of the candidate attribute combinations. For example, one or more transformation functions may be applied to the raw attribute values. In some embodiments, statistical transformation functions called smoothing functions such as Laplacian smoothing and/or Gaussian kernel density smoothing may be used.

The detection of sensitive data (and/or other types of targeted data) may be performed at a network-accessible service of a provider network or cloud computing environment in at least some embodiments. A request for sensitive data presence analysis with respect to one or more data stores may be received via programmatic interfaces of such a service, and operations corresponding to the record sampling, feature generation and execution of the machine learning model may be initiated in response to the request. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a sensitive data detection service providing functionality of the kind discussed above. A VCS may also be referred to as an elastic compute service, virtual machines service, computing cloud service, compute engine, and/or cloud compute in various implementations.

In some embodiments, a computer-implemented method may comprise obtaining a first data set indicating a distribution of one or more properties of a group of entities with respect to which targeted information presence analysis (such as the analysis of the presence of sensitive information of one or more types) is to be performed. For example, the one or more properties may comprise a population density as a function of geographical location. The method may also include identifying one or more candidate attribute combinations from a plurality of attributes of records of a second data set, where individual ones of the candidate attribute combinations meet a data type similarity criterion with respect to a collection of data types of targeted information of the entities of the group of entities. The method may include generating, corresponding to individual candidate attribute combinations and the first data set, a collection of input features for a machine learning model, including at least one feature indicative of a statistical relationship between the distribution of the one or more properties and attribute values of an individual candidate attribute combination. The method may further include obtaining an indication of a predicted probability of a presence of targeted information in the second data set. The predicted probability may be obtained from the machine learning model using at least the collection of input features.

The method may comprise obtaining an indication, via one or more programmatic interfaces, that a data store is to be analyzed for the presence of targeted information in various embodiments. In response to receiving such an indication, a subset of the data store comprising the second data set may be selected for analysis in some embodiments, e.g., so that the entirety of the data set does not have to be examined. Information about the topology (the logical or hierarchical arrangement) of the data store may be obtained and used to sample the contents of the data store so that a representative subset is analyzed in such embodiments.

One or more filters, which may be referred to as semantic filters, may be applied to values of individual attributes of the second data set to identify the candidate attribute combinations in some embodiments. The filters may be defined based at least in part on characteristics or properties of the targeted information whose possible presence is to be detected. In one embodiment in which the presence of sensitive geographical location information is detected using human population density datasets, candidate attribute combinations may be selected based at least in part on compute a ratio of (a) a number of records of a samples set of records whose attribute values for a particular attribute lie within an expected, acceptable or valid range of values corresponding to a particular representation of a geographic location and (b) a number of records of the sample whose attribute values for the particular attribute are non-empty. In another embodiment, a similarity metric such as a Jaccard similarity may be computed between (a) the set of records of a first attribute with values within an acceptable/valid range for targeted/sensitive data and (b) the set of records a second attribute with values within the acceptable/valid range for targeted/sensitive data should be considered a candidate for further analysis.

Generation of the collection of input features for the machine learning model may comprise several different computations in various embodiments. For example, in some embodiments, the first data set may comprise a plurality of data points (e.g., human population density in various districts, towns or cities of one or more countries), and the process of generating the input features may include (a) assigning individual data points of the first data set to respective cells of a grid (such as a 2-dimensinal grid with each cell representing some geographical area) and (b) assigning respective values of a particular candidate attribute combination to respective cells of the grid. The process of generating the input features in such a scenario may further comprise identifying a group of cells of the grid for which counts of assigned values of the particular candidate attribute combination exceed zero, and determining one or more metrics of correlation between (a) the counts of assigned values of the particular candidate attribute combination of individual cells of the group of cells and (b) values (e.g., a weighted average of the human population density values) obtained from the data points of the first data set which were assigned to the individual cells of the group of cells.

In some embodiments, generating the collection of input features may include determining a metric of correlation between values of at least a pair of attributes of a particular candidate attribute combination. In at least one embodiment, generating the collection of input features may include executing a goodness-of-fit test and using a result of the goodness-of-fit test as a feature. The collection of expected values of the goodness-of-fit test may be based at least in part on values of the first data set, and the collection of observed values of the goodness-of-fit test may be based at least in part on the values of a particular candidate attribute combination.

According to one embodiment, one or more non-transitory computer-accessible storage media may store program instructions that when executed on or across one or more processors cause the one or more processors to identify one or more candidate attribute combinations from a plurality of attributes of records of a first data set. Individual ones of the candidate attribute combinations may meet a data type similarity criterion with respect to a collection of data types of targeted/sensitive information of entities of a group of entities. The instructions when executed may also generate, corresponding to individual ones of the one or more candidate attribute combinations, a collection of input features for a machine learning model. At least one feature may be indicative of a statistical relationship between the (a) attribute values of the individual candidate attribute combination and (b) a second data set indicating one or more properties of a group of entities with respect to which targeted/sensitive information presence analysis is to be performed. The instructions when executed may also obtain, from a machine learning model to which at least the collection of input features is provided, an indication of a predicted probability of a presence of targeted/sensitive information in the first data set.

Any of a variety of machine learning models may be used in different embodiments, such as logistic regression models, neural-network based models and the like. In at least some embodiments, in response to determining that the predicted probability of the presence of targeted/sensitive data exceeds a threshold, an indication that the threshold has been exceeded may be provided via one or more programmatic interfaces. Further, in at least one embodiment, the names of attributes of a particular candidate attribute combination may also be transmitted via the one or more programmatic interfaces, such that the predicted probability was generated as output by the model for one or more input features corresponding to the particular candidate attribute combination. In other words, the specific attributes whose values led to the prediction of the presence of targeted/sensitive data may be indicated programmatically to one or more destinations.

In some embodiments, clients of a network-accessible service at which the detection of targeted/sensitive data is performed may provide guidance with respect to various aspects of the detection technique via one or more programmatic interfaces. For example, an indication of one or more of: (a) a hyper-parameter of the machine learning model, (b) a feature generation algorithm, (c) a technique to be used to identify candidate attribute combinations, and/or (d) a record sampling algorithm may be provided by the clients and obtained at the service. Presence of any of a variety of different categories of targeted/sensitive information may be detected in different embodiments using the techniques introduced above, such as (bit not limited to) GPS coordinates, account identifiers, or user identifiers.

Example System Environment

FIG. 1 illustrates an example system environment in which efficient statistical techniques for detection of the presence of sensitive data within data sets may be implemented, according to at least some embodiments. As shown, system 100 comprises resources and artifacts of a sensitive data detection service (SDDS) 102, including data reducers 148, feature generators 152, and machine learning model training and execution managers 156. The SDDS 102 may implement one or more programmatic interfaces 177, such as web-based consoles, application programming interfaces (APIs), command-line tools, graphical user interfaces and the like, which can be used by clients of the SDDS 102 to submit programmatic requests related to the detection of sensitive data in specified data sets and receive corresponding responses. Such requests may be submitted from any of a variety of client devices 180, such as desktops, laptops, mobile computing devices and the like.

Clients of the SDDS may store data at any combination of one or more data stores 120, such as data store 120A, 120B or 120C in the depicted embodiment. Individual data stores may support different kinds of data models. For example, some data stores 120 may comprise relational database instances, others may comprise non-relational or NoSQL databases, others may store files in hierarchically arranged file systems, while still others may allow collections of arbitrary objects (objects for which the internal structure is not imposed by the data store, but is left up to the client) to be stored within containers called buckets which can be accessed via web service interfaces. Data store 120A may include a client C1's database tables 122 in the example scenario depicted in FIG. 1, distributed across one or more database instances. Data store 120B may include a client C2's file systems 123, while data store 120C may include a client C2's object buckets 124. A given data store 120 may comprise very large volumes of data (e.g., petabytes or even exabytes), which may in some cases grow fairly rapidly over time.

Clients whose data is stored in the data stores 120 may utilize the SDDS 102 to efficiently detect whether any of their data contains 120 sensitive or personal data of various types in the depicted embodiment. The SDDS 102 may thus be responsible for classifying data sets at various granularities into one of two categories: sensitive-data-containing data sets, and sensitive-data-less data sets. Each of the data stores 120 is assumed to comprise at least some structured records in the depicted embodiment, e.g., records containing a plurality of attributes or columns (with respective data types) within which the presence or absence of sensitive data is to be detected. In other embodiments, the SDDS 102 may also be able to analyze unstructured data, e.g., by first transforming the unstructured data into a more structured collection of multi-attribute records.

Information about the kinds of data (e.g., floating point values for latitude and longitude in the case of GPS coordinates, 10-digit integers telephone in the case of telephone numbers within the United States, etc.) which is to be considered sensitive may be stored in sensitive data type descriptors 140 at the SDDS 102. Semantic information about the various kinds of sensitive data (such as the valid ranges of latitude and longitude values, the fact that latitude values are typically not very similar with respect to corresponding longitude values within GPS coordinates, etc.) may be stored in sensitive data semantics descriptors 144 at the SDDS 102 in the depicted embodiment. In various embodiments, information about the data types and the semantics of sensitive data categories of interest may be provided to the SDDS 102 via programmatic interfaces 177, e.g., by clients of the SDDS or by experts in data privacy and security. Semantics information may be encoded in a variety of ways in different embodiments, e.g., in terms if rules such as "the ratio of valid/acceptable values (in range X to Y) to the total number of non-null values in a given attribute should be at least Z %".

In order to detect whether a given data store comprises instances or examples of sensitive data, the SDDS 102 may employ a statistical or population-level analysis approach in the depicted embodiment. The data sets (e.g., collections of one or more tables, files or other data objects) at data stores 120 which are targeted for analysis for the presence of sensitive data may be referred to as target data sets, and the corresponding data stores may be referred to as target data stores herein. With respect to a given category of sensitive data (such as GPS location data, gathered after users have "opted in" or granted permission for the collection of such data) one or more authoritative relevant data sources 141 may be identified in at least some embodiments. Such data sources may comprise non-target data sets with information which is assumed to be correlated with, or have other statistical relationships with, the corresponding category of sensitive data. In a scenario in which the sensitive data being considered comprises GPS values indicating the locations of individuals around the world, an example of an authoritative relevant data source 141 may include a database providing values of human population density as a function of geographical location or position (e.g., for various cities/towns, districts/counties, states, regions, countries, etc., depending on the logical boundaries in use in different countries). The assumption behind using such population density data is that if a given target data set contains GPS coordinates of human beings as they live their daily lives, the places corresponding to more frequent occurrences of such GPS in the target data set would be more likely to be places with higher human population density. For example, it would be more likely that the GPS coordinate data in the target data set (if the target data set does in fact contain GPS coordinates) is concentrated in areas close to large, densely populated cities or regions than in areas which correspond to the middle of an ocean or the middle of a thinly-populated desert. Based on this assumption, if pairs of floating point values in large numbers of records of a target data set are mapped to geographical areas assuming that the floating point values represent GPS coordinates, and such maps exhibit a high correlation with human population density maps derived from data sources 141, this would indicate that there is a high probability that the target data set does in fact contain GPS coordinates. Other similar population based inferences relying on non-target data sets from relevant data sources may be made for categories of sensitive data other than GPS coordinates in various embodiments.

The data reducers 148, feature generators 152 and the machine learning model training and execution managers 156 may comprise software and/or hardware components of one or more computing devices in the depicted embodiment. As suggested by their name, the data reducers 148 may be responsible for reducing or sub-sampling the data of the target data stores such as data stores 120A, 120B or 120C. The data reducers 148 may identify a plurality of structured data objects of a target data store to be analyzed for a presence of sensitive data (such as geographical location details pertaining to individuals). Each structured data object may comprise one or more records, with each record comprising values of one or more fields, attributes or columns in various embodiments. The sensitive data whose presence is to be detected may be expressed using one or more data types indicated in sensitive data type descriptors 140 (for geographic location details, for example, a pair of floating point values representing latitude and longitude).

The data reducers 148 may select a sample of records from a given structured data object in the depicted embodiment, e.g., using information about the topology or hierarchical organization of the data object provided by an SDDS client or indicated by metadata of the target data store 120. Such topological information may indicate for example, the collection of attributes or columns for various structured data objects (which may be referred to as the schemas of the structured data objects), the distribution and sizes of files within a file system hierarchy, the distribution and sizes of the data objects within different bucket prefixes associated with a given bucket, the sizes of the tables in a database, etc. The objectives of the sampling may include capturing representative, consistent (with respect to data types) but reasonably small subsets of the data contained in the structured data objects of a target data store as a whole, as well as a representative but reasonably small subset of the records of individual structured data objects. Within a given data store, data type-based or schema-based sampling may be used to identify the set of structured objects to be analyzed together as a group in some embodiments. Within a given structured data object or a given collection data objects with a common schema, in at least one embodiment, random sampling may be used to identify the number of records to be analyzed further.

After the sample records to be analyzed has been identified for a given structured data object (or a collection of structured data objects with a common schema) the attributes of the sampled records may be analyzed in the depicted embodiment. It may often be the case that there are several different combinations of attributes whose data types match those of the sensitive data—e.g., there may be N different attributes which contain floating point values, which means that $(N*(N-1)/2)$ pairs of attributes may have to be considered as possibilities for containing GPS coordinates. In at least some embodiments, one or more candidate attribute combinations may be identified (e.g., by the data reducers 148) from the attributes of the records, such that (a) each of the candidate attribute combinations meet a data type similarity criterion with respect to the category of sensitive data being considered and (b) attribute values of each of the candidate attribute combinations satisfy one or semantic filtration criteria (e.g., criteria based in the semantics descriptors 144) associated with the category of sensitive data. A given attribute combination may comprise one or more attributes in various embodiments. In effect, in this phase of the operations performed for a given structured data object, an attempt may be made to eliminate attribute combinations from of the records from further analysis, e.g., using sensitive data type descriptors 140 and sensitive data semantics descriptors 144 to filter out attribute combinations which are less likely to contain sensitive data. Examples of such filtering techniques are provided below, e.g., in the context of the description of FIG. 5.

Having reduced, to the extent possible, the number of combinations of attributes to be considered, the data reducers 148 may provide an indication of the identified candidate attribute combinations to the feature generators 152. The feature generators 152 may use the authoritative relevant data sources 141 and the values in the candidate attribute combinations to generate, corresponding to individual candidate attribute combinations, a collection of input features for a machine learning model. Examples of the kinds of features which may be generated are provided below, e.g., in the context of the description of FIG. 6. Some features may be based on metrics of correlations between the relevant non-target data (obtained from data sources 141) and the values for the candidate attribute combinations of the target data sets.

The machine learning model training and execution managers 156 may train one or more classifiers or other machine learning models to predict, given an input collection of features produced by the feature generators, a probability that the attribute combination represented by the features contains sensitive data in the depicted embodiment. In some embodiments, a labeled training data set may be prepared using feature sets generated by the feature generators on a set of selected structured data objects, with the labels being obtained from human annotators or labelers. Once the model(s) have been trained using this labeled training data set, the trained version of the machine learning models may then generate predicted probabilities of the presence of sensitive data for feature collections produced by feature generators for any desired target data sets.

Any of wide variety of machine learning models and algorithms may be used in different embodiments, such as logistic regression models, neural network-based models, and the like. The predicted probability of the presence of sensitive data within their data objects may be used to classify the data stores 120 as sensitive-data-containing, or as sensitive-data-less in various embodiments using the following approach. If any given attribute combination of any given structured data object is found to have a predicted probability higher than a selected threshold, the data store 120 may be classified as sensitive-data-containing. In at least some embodiments, the predicted probabilities may be transmitted to one or more destinations via programmatic interfaces, such as to client devices 180 and/or to one or more sensitive data presence automated response managers 168. A sensitive data presence automated response manager 168 may, for example, initiate actions such as preventing access at least temporarily to a data set found to have a high probability of containing sensitive data, automatically encrypt such data sets, and so on. In at least some embodiments, in addition to simply providing the probability that a data set or a data store has sensitive data, details about the particular attributes and/or data objects within which the sensitive data is likely to be found may be provided via programmatic interfaces.

Example Categories of Sensitive Data

Figure 2:
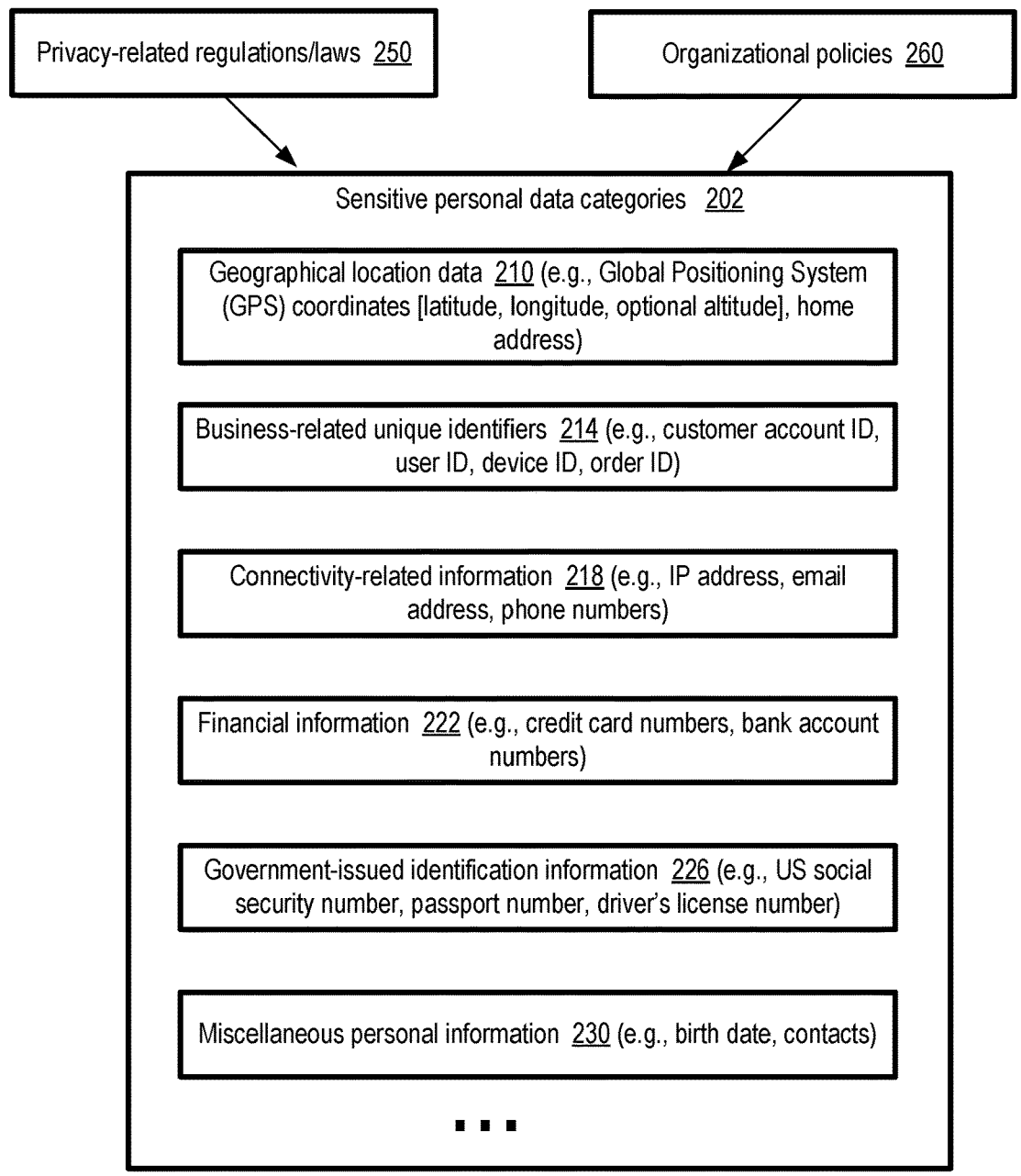
FIG. 2 illustrates example categories of sensitive data whose presence within data sets may be detected using automated analysis, according to at least some embodiments.

FIG. 2 illustrates example categories of sensitive data whose presence within data sets may be detected using automated analysis, according to at least some embodiments. In the depicted embodiment, two sources may determine or define the set of sensitive personal data categories 202: privacy-related regulations/laws 250 (e.g., similar to GDPR), and organizational policies 260. Some businesses and/or governmental organizations may wish to provide even higher levels of privacy and data security to their clients or end users than are mandated by the privacy-related regulations or laws in effect, and may therefore enforce their own organizational policies 260 which define additional types of data which is to be protected.

Sensitive personal data categories 202 may include geographical location data 210 such as GPS coordinates showing where individuals have been at various points in time, home addresses and the like. GPS coordinates may, for example, include at least two floating point or real numbers representing latitude and longitude, and may also include an additional floating point value indicating altitude in some cases. Home addresses may be expressed in different ways depending on the customs and laws of the countries involved 15—e.g., in some countries street numbers may be written before street names, while in other countries street numbers may be written after street names.

A number of business-related unique identifiers 214 may be considered sensitive personal data in some embodiments, such as customer or client account identifiers, user identifiers, device identifiers associated with electric devices used to interact with a business, order identifiers associated with orders submitted to a business, and so on.

In some cases, one or more types of network connectivity-related information 218 may be considered sensitive personal data. For example, Internet Protocol (IP) addresses of computing devices, email addresses, phone numbers and the like may all provide personal information that individuals may not wish to be made public or used without their explicit consent in at least some scenarios.

Financial information 222 which may be considered personal and sensitive may include, for example, credit card numbers, bank account numbers and so on. Sensitive government-issued identification information 226 may include, for example, social security numbers issued by the United States government to its citizens and residents, passport numbers, driver's license numbers and the like. Miscellaneous personal information 230 which may be considered sensitive by privacy regulations and/or organization policies may include birth dates, information about individuals contacts (e.g., as indicated by a mobile phone's contact list or an email account's contact list), and so on. In some embodiments, examples of other sensitive personal data categories than those shown in FIG. 2 may also or instead be detected by a sensitive data detection service similar in functionality to SDDS 102 of FIG. 1.

Workflow for Sensitive Data Detection in Large Data Stores

Figure 3:
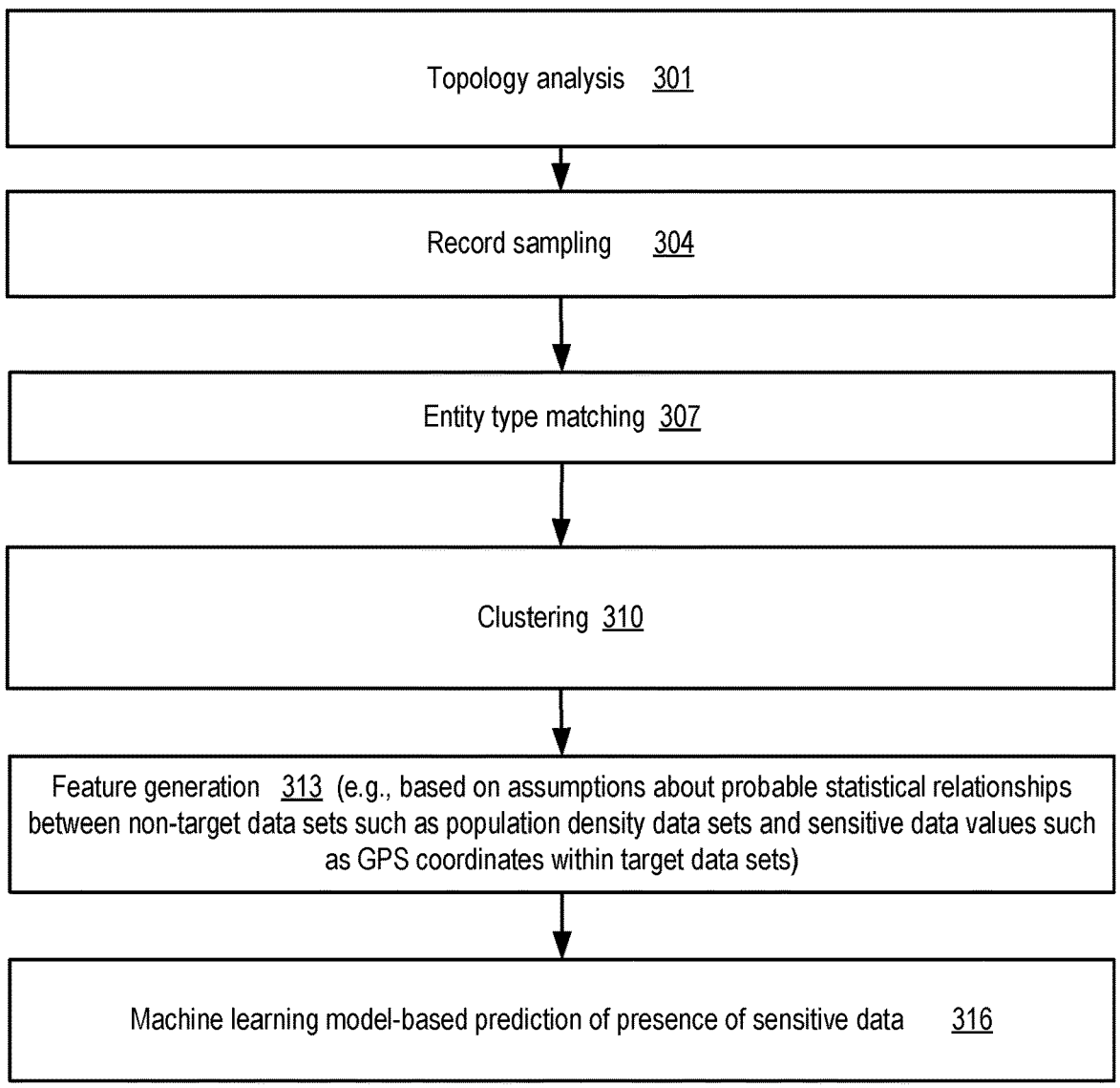
FIG. 3 illustrates an example high-level workflow for sensitive data detection for large scale data stores, according to at least some embodiments.

FIG. 3 illustrates an example high-level workflow for sensitive data detection for large scale data stores, according to at least some embodiments. In an initial topology analysis phase 301, information about the distribution of data within the target data store(s) may be obtained and examined, e.g., using metadata such as attribute data type information. Record set definitions which approximate the contents of object types stored in the target data stores may be created in this phase, so that it becomes possible to obtain clusters of data which are structurally similar and have a high probability of having been created by the same processes (applications, services, etc.) and thus having similar semantics. In addition to determining record set definitions, another objective of the topology analysis may include obtaining density information regarding the records (e.g., how much data is contained in various subsets of the records), so that representative samples of records can be obtained. Topology analysis may be performed with a lower frequency that the frequency of other steps of the workflow in some embodiments, as topology of a data store tends to change less frequently than the data itself. In some embodiments, topology analysis may not necessarily be performed for at least some data stores.

In the record sampling phase 304, if the size of the target data store exceeds a threshold, a subset of its records may be extracted for further analysis in at least some embodiments. Note that record sampling may not necessarily be performed for smaller target data stores. A representative sample of records may, for example, comprise random samples which exhibit similar distribution of the parent population of records. For example, if directory A contains 50% of a data store's contents (as measured by the cumulative size of its records), directory B contains 30% of the contents and directory C contains 20%, 50% of the sampled record collection should ideally comprise records from directory A, 30% should ideally comprise records from directory B, and 20% should ideally comprise records from directory C. In some embodiments in which topology analysis is performed, results obtained from the topology analysis may be used to guide record sampling.

In entity type matching phase 307, the content of various attributes of the sampled records may be examined, and named entity recognition techniques may be used to identify the data types of entity types of the attributes. Any of a wide variety of techniques may be used for recognizing the entity types. For example, dictionary based algorithms implemented with indices may be used in some embodiments, while prefix trees or other data structures that store and efficiently retrieve text patterns may be used in other embodiments. Regular expressions (with or without validation filters) may be used in at least one embodiment. Deep neural network based named entity recognition techniques may be used in some embodiments, e.g., for text attributes. Note that entity type matching may typically be performed at the instance level (e.g., per record attribute or per record) and not at the population level, so the inference possible during this phase is restricted to instance level information.

The objectives of the clustering phase 310 may include grouping records with homogeneous internal structure (e.g., the same types of attributes) together. In some embodiments, for example, the data being analyzed may be stored at an object storage service that does not require schemas or internal structure (such as lists of attribute names); for example, a given data set may include JSON (JavaScript Object Notation) files, comma-separated variable (CSV) files, tab-delimited text files, etc. As part of the clustering phase, in some embodiments, groups of records which satisfy a structural similarity criterion (e.g., JSON files with similar or identical internal fields, CSV files with similar data types in corresponding fields, etc.) may be identified and then combined into respective clusters. In effect, in various embodiments, clustering may be considered the equivalent of imposing a deduced or inferred structure on a collection of records for which structural constraints were not originally explicitly specified or required. Clustering may be needed in addition to topological analysis in some cases because the topological analysis may rely primarily on examining metadata, and the record set definitions obtained in the topological analysis may not result in truly homogeneous records. Clustering may not be required for at least some data stores in some embodiments.

Feature generation 313 may create representations of selected attribute combinations of the sampled records (or of clusters of sample records) in formats which can be provided as input to machine learning models. Depending on the type of data sets in the data stores and the categories of sensitive data to be detected, at least some features may be computed based on assumptions about probable statistical relationships between external or non-target data sets (such as population density distributions across geographies) and potential sensitive data values (such as GPS coordinates) within target data sets in various embodiments.

A final stage of the workflow may comprise machine learning-based prediction of the presence of sensitive data 316 within the records of the target data sets. A variety of machine learning algorithms and models may be used in different embodiments, including relatively simple logistic regression models, neural network-based models and the like. In some embodiments, different models may be trained for respective categories of candidate attribute combinations of the target records. In at least one embodiment, for each input feature collection, which may be generated for a given attribute combination, a score (e.g., a real number between 0 and 1) may be generated by a model, with higher scores indicating higher probabilities of the presence of sensitive data, and lower scores indicating lower probabilities. If the score exceeds a pre-selected threshold such as 0.5 (which may be considered a hyper-parameter of the workflow), the data set and data store containing the attribute combination may be designated as a sensitive-data-containing data set and data store.

GPS Coordinate Detection Example

Figure 4:
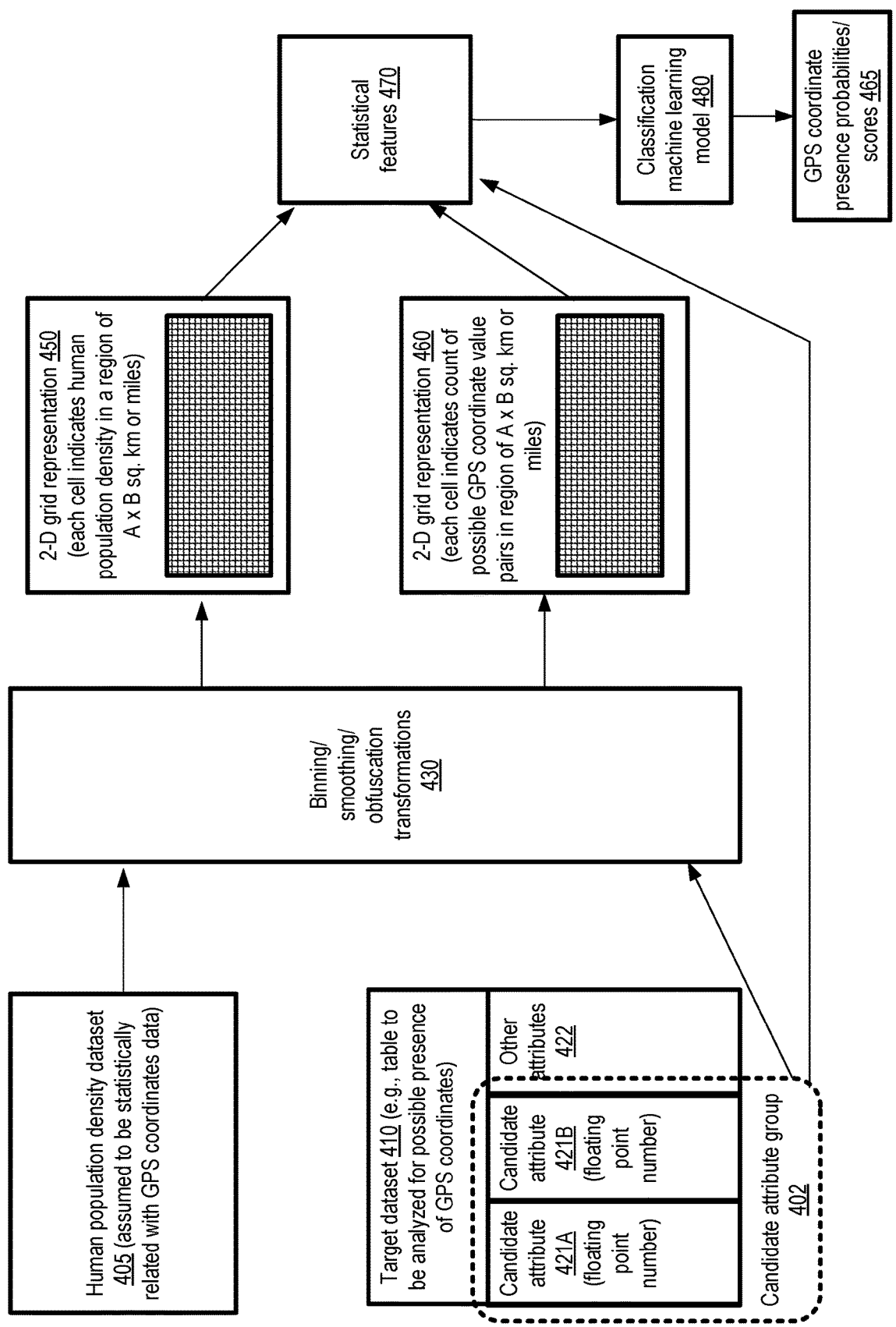
FIG. 4 illustrates an example methodology in which human population density data may be used to detect the presence of sensitive geographical location data within target data sets, according to at least some embodiments.

As discussed above, one example of sensitive personal data which may be detected using the techniques introduced above is geographical location data such as GPS coordinates. FIG. 4 illustrates an example methodology in which human population density data may be used to detect the presence of sensitive geographical location data within target data sets, according to at least some embodiments. A human population density dataset 405 may be obtained at a sensitive data detection service similar to SDDS 102 of FIG. 1, e.g., from an authoritative data source such as one or more government agencies. This dataset may indicate the population densities for various administrative units such as towns, cities, districts, counties, states and so on, for one or more countries. Candidate attributes 421A and 421B comprising respective floating point values may be identified within a target dataset 410. These attributes may be considered candidates for sensitive attributes because GPS coordinates may also comprise floating point values, one for latitude and one for longitude in the depicted embodiment. (Optional altitude components of GPS coordinates are not considered in the example shown in FIG. 4). The target dataset 510 may of course also include other attributes 422, which may be rejected as candidates for containing GPS data because of their data type or based on filtering techniques such as those discussed in the context of FIG. 5.

One or more transformation operations may be applied to the candidate attribute group 402 and also to the human population density dataset 405 in the depicted embodiment. These transformation operations may include binning, smoothing and/or obfuscating transformations 430. Binning refers to assigning values (e.g., values of candidate attributes 421A and 421B from the same record, or values of population density data corresponding to a given geographical area represented as a cell within a 2-dimensional grid) of a dataset to cells of a grid as a way of representing the spatial distribution of the dataset. Smoothing refers to mathematical/statistical functions, such as Laplacian smoothing or Gaussian kernel density smoothing to improve the power of various types of statistical tests conducted on the datasets, to avoid divide-by-zero errors in the statistical tests, and so on. Obfuscating (which may be one of the by-products of some smoothing techniques such as Gaussian kernel density smoothing) refers to hiding the raw values of the potentially sensitive data, so that the probability of the raw values being exposed as a result of the sensitive data detection procedure are reduced. For example, in one implementation, as a result of the introduction of random noise using Gaussian kernel density smoothing, the candidate GPS coordinate values may be spread in a radios of 175 kilometers around the original values with a probability of 97.5%. Binning may also help in reducing memory required for the sensitivity data analysis, as it results in a more compact representation than the un-binned version. As shown in FIG. 4, obfuscation/transformation techniques may be applied to the raw data of the target dataset prior to the generation of features in various embodiments.

After the transformations are applied to the raw data, a 2-dimensional (2-D) grid representation 450 of the human population density dataset 405 may be obtained in the depicted embodiment, with each cell indicating average human population density in a region of A×B square kilometers or miles. Similarly, another 2-D grid representation 460 of the values of the candidate attribute group 402 may be created, with each cell of the grid 460 indicating a count of possible GPS coordinate value pairs in the same regions of A×B square kilometers or miles.

Using these 2-D grid representations as well as the candidate attribute group values, a set of statistical features 470 may be generated in the depicted embodiment. For example, one or more of the features may represent statistical relationships (e.g., correlations) between the population density dataset and the candidate attribute group values. In scenarios in which there are multiple candidate attribute groups in the target dataset 410 (e.g., if there are more than two floating point number attributes), respective sets of statistical features 470 may be created for each candidate attribute group. The feature sets 470 may be provided as input to a classification machine learning model 480 in the depicted embodiment, which may generate probabilities/scores 465 for the presence of GPS coordinate values in the candidate attribute group(s).

Filtering of Candidate Attributes

Figure 5:
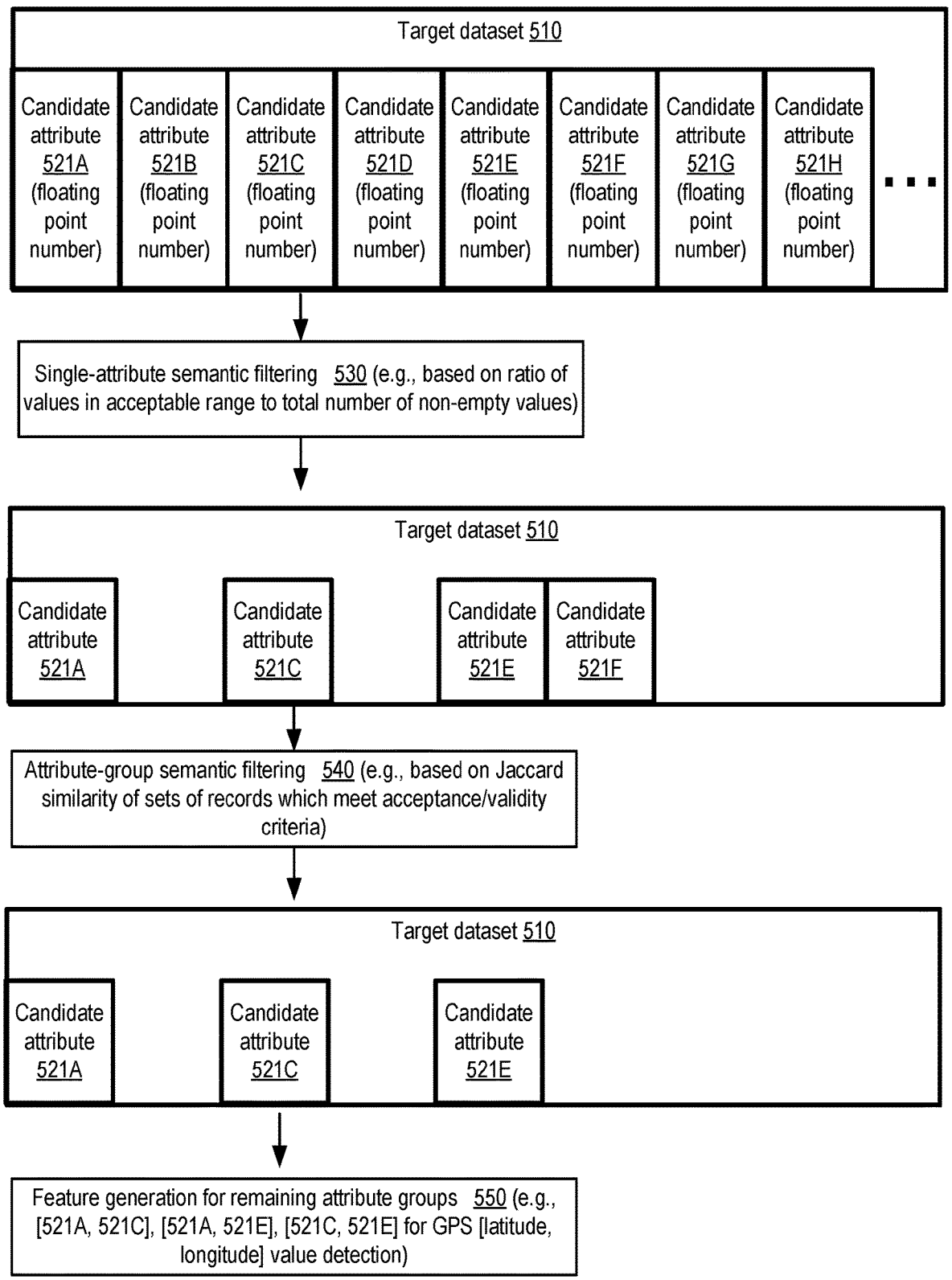
FIG. 5 illustrates example techniques for semantics-based filtering of candidate attributes for sensitive data analysis, according to at least some embodiments.

FIG. 5 illustrates example techniques for semantics-based filtering of candidate attributes for sensitive data analysis, according to at least some embodiments. The probability of the presence of GPS latitude and longitude values (expressed as respective floating point numbers) within pairs of attributes of a target data set 510 is to be estimated in the scenario depicted in FIG. 5. Target data set comprises eight initial candidate attributes 521A-521H which comprise floating point values; that is, based on their data types alone, any of these eight attributes may comprise latitude or longitude values. This means that, in theory, 56 (8×7) initial candidate attribute pairs (pairs of attributes which could contain latitude and longitude values respectively) may have to be analyzed further.

Based on the semantics of GPS coordinates representing locations of individuals, however, this large number of attribute combinations may be reduced substantially in the depicted embodiment. Firstly, single-attribute semantic filtering 530 may be performed, in which values of individual candidate attributes are examined to determine whether the values meet criteria for being GPS coordinates. For example, latitude values can only be within a relatively small sub range of floating point values (e.g., −90.0 to +90.0), and longitude values can also only be within a relatively small range (e.g., 0.0 to 180.0). The manner in which latitude and longitude are mapped to floating point values may differ from one application to another, but their values cannot lie outside such small ranges regardless of the application. In one type of single-attribute semantic filtering for GPS coordinate values, the ratio of the number of values which lie in the acceptable range for latitude or longitude to the total number of non-empty or non-null floating point values for each attribute may be computed. If this ratio is below a threshold for a given candidate attribute 521, e.g., if most of the floating point values are greater than 180.0 or less than −90.0, that candidate attribute may be rejected from further consideration in the depicted embodiment. Other rules for single-attribute semantic filtering may of course be used for other types of sensitive data.

Single-attribute semantic filtering 530 leads to the elimination of candidate attributes 521B, 521D, 521G and 521H in the depicted example scenario. Next, one or more attribute-group semantic filtering techniques 540 may be employed to further reduce the candidate attribute count in at least some embodiments. For example, latitude and longitude values are both expected to be present if a record contains GPS coordinates; storing only latitude or only longitude instead of the combination of latitude and longitude would usually not qualify as an example of storing GPS coordinates. Thus, for a given record, values in both attributes being considered have to be in valid ranges for latitude and longitude for that pair of attributes to be designated as a GPS-coordinate-containing attribute pair. Accordingly, as part of attribute-group semantic filtering, In one embodiment, Jaccard similarity between the sets of records of target data set 510 whose values for each pair of 521A, 521C, 521E and 521F lie within acceptable GPS coordinates ranges may be computed. If the Jaccard similarity index is below a threshold for a given pair of candidate attributes, this means that that pair is not likely to contain GPS coordinates in such an embodiment. Accordingly, such below-threshold-similarity pairs of attributes may also be discarded from further consideration. The pairings of candidate attribute 521F (i.e., (521A, 521F), (521C, 521F), and (521E, 521F)) all fail to satisfy the Jaccard similarity index threshold in the example scenario shown in FIG. 5, so they too are eliminated. This leaves only the pairs of candidate attributes which can be formed from candidate attributes 521A, 521C and 521E. Feature generation for the machine learning model may therefore only have to be performed for pairs (521A, 521C), (521A, 521E) and (521C, 521E) in the depicted scenario, as shown in element 550. Other types of attribute-pair or attribute-group semantic filtering may be performed in some embodiments to reduce the number of candidate groups for which features have to be generated with respect to a given target data set in different embodiments. In some embodiments, only single-attribute semantic filtering may be performed while in other embodiments, only attribute-pair or attribute-group semantic filtering may be performed.

Example Features Derived from Candidate Attribute Groups

Figure 6:
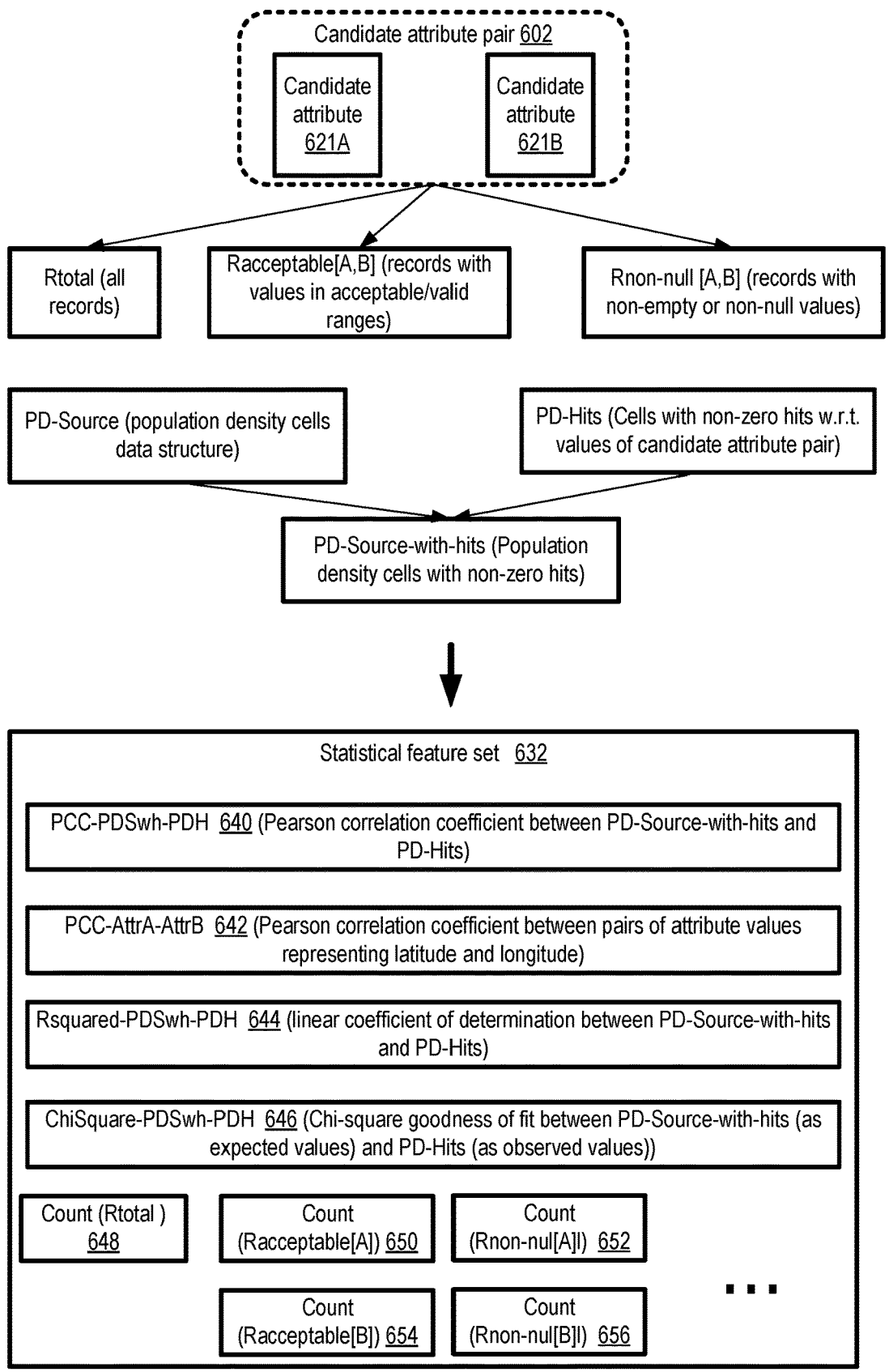
FIG. 6 illustrates example statistical features which may be provided as input to a machine learning model to detect the presence of sensitive geographical data in a data set, according to at least some embodiments.

FIG. 6 illustrate example statistical features which may be provided as input to a machine learning model to detect the presence of sensitive geographical data in a data set, according to at least some embodiments. In the example scenario depicted in FIG. 6, pair 602 of candidate attributes to be analyzed using machine learning for the presence of GPS coordinates comprises candidate attributes 621A and 621B, each of which comprises a floating point value. The candidate attributes 621A and 621B belong to a target data set comprising a plurality of records, such that individual ones of the records comprise values of one or more attributes (though some attributes may be empty or null for some records). The candidate attributes 621A and 621B may have been selected for further analysis, including feature generation for a machine learning model, using the kinds of semantic filtering discussed in the context of FIG. 5 in at least some embodiments.

In the depicted embodiment Rtotal represents the total number of records in the target data set for which analysis of candidate attribute pair 602 is to be performed, Racceptable[A] is the subset of records with values in acceptable/valid/expected ranges for GPS coordinates (e.g., latitude) in candidate attribute 621A, Racceptable[B] is the subset of records with values in acceptable/valid/expected ranges for GPS coordinates (e.g., longitude) in candidate attribute 621B, Rnon-null [A] is the subset of records which have non-null values in candidate attribute 621A, and Rnon-null [B] is the subset of records which have non-null values in candidate attribute 621B.

PD-Source is a 2-dimensional grid data structure with cells containing aggregated or actual population density data (similar to 2-D grid representation 450 of FIG. 4) for respective geographical areas corresponding to the cells. PD-Hits comprises those cells of a 2-dimendional grid data structure generated from the values in the candidate attribute pair 602 which contain a non-zero count. PD-Source-with-hits is the subset of those cells of PD-Source corresponding to the PD-Hits cells—that is, those cells of PD-Source for which there were zero hits from the values stored in candidate attribute pair 602 have been removed or zeroed out to obtain PD-Source-with-hits.

A toy example may be helpful in explaining PD-Source, PD-Hits and PD-Source-with-hits. Assume that the area of the world which is of interest with respect to GPS coordinates, and for which population density data is available from an authoritative source, comprises a square 20 kilometers by 20 kilometers. We construct a 2×2 grid data structure PD-Source to represent the population density data, with each cell of the four cells representing a 10×10 square kilometer area corresponding to a respective GPS coordinate range for latitude and a GPS coordinate range for longitude. Assume further that the population density data is as follows for the four cells: PD-Source[0,0]=10, PD-Source [0,1]=5, PD-Source [1,0]=25, and PD-Source [1,1]=2.

We also construct a 2×2 grid data structure CAP-Source for the contents of the candidate attribute pairs 621A and 621B, with each cell representing the same GPS ranges as the cells with the corresponding indexes in PD-Source. Thus, CAP-Source[0,0] corresponds to the same geographical area/region as PD-Source[0,0], CAP-Source[0,1] corresponds to the same geographical area/region as PD-Source [0,1], and so on.

Assume that there are 100 records in the target data set, each containing non-null floating point values for both attributes 621A and 621B. Of the 100 possible GPS coordinate sets in the target data set, assume 80 are in the acceptable ranges for latitude and longitude. We determine how many of those 80 possible GPS values could lie within each of the cells of CAP-Source. Assume that this mapping of the 80 possible values to the 2×2 grid is as follows: the count (number of hits) in CAP-Source[0,0] is 18, there are 12 hits in CAP-Source[0,1], there are 50 hits in CAP-Source [1,0] and zero hits in CAP-Source[1,1]. (The total counts from all four cells is 80, as expected.)

To obtain PD-Hits from CAP-Source, we simply eliminate the cells with zero hits. So PD-Hits has just three elements: PD-Hits[0,0]=18, PD-Hits[0,1]=12, and PD-Hits [1,0]=50.

To obtain PD-Source-with-hits from PD-Source, we eliminate cells with the same indexes as the cells which were eliminated from CAP-Source to obtain PD-Hits. Thus PD-Source-with-hits also has just three elements: PD-Source-with-hits[0,0]=10, PD-Source-with-hits [0,1]=12, and PD-Source-with-hits [1,0]=25.

The intuition behind eliminating the cells with zero hits from both PD-Source and CAP-Source is as follows. The data in the candidate attribute pair 602 may actually be GPS coordinates which should be detected by the machine learning model, but it may only be GPS coordinates of people within a particular region or country. In contrast, the PD-Source population density data may represent population densities over the entire world, or over a region which is much larger than the particular region or country. By removing the zero-hit cases, we increase the chances of finding correlations between the candidate attribute values and population density data for the specific region or area represented by the candidate attribute values. For example, if the candidate attribute pair represented GPS coordinates of people within France, the values in the candidate attribute pair may be reasonably highly correlated with population density of France, but not as correlated with the population density of Europe as a whole or the world as a whole.

In the embodiment depicted in FIG. 6, a statistical feature set 632 is generated to represent the candidate attribute pair 602. Feature PCC-PDSwh-PDH 640 is a Pearson correlation coefficient between PD-Source-with-hits and PD-Hits. Feature PCC-AttrA-AttrB 642 is a Pearson correlation coefficient between the values of attributes 621A and 621B. Rsquared-PDSwh-PDH 644 is a linear coefficient of determination between PD-Source-with-hits and PD-Hits. ChiSquare-PDSwh-PDH 646 is a result of a chi-square goodness of fit test between PD-Source-with-hits (considered the expected values for the purpose of the test) and PD-Hits (considered as observed values for the purpose of the test). Count(Rtotal) 648 is the total number of records in the target data set. Count(Racceptable[A]) 650 is the number of records in the target data set with values that are acceptable/valid for GPS latitude values, while Count(Racceptable [B]) 654 is the number of records in the target data set with values that are acceptable/valid for GPS longitude values. Count(Rnon-null[A]) 652 is the number of records in the target data set with non-null values for attribute 621A, while Count(Rnon-null[B]) 656 is the number of records in the target data set with non-null values for attribute 621A. All of these statistical features may be combined in a single feature collection record (e.g., a vector of numeric values) and provided as input representing candidate attribute pair 602 to a classifier or other machine learning model in the depicted embodiment. The model may generate a corresponding score indicating a probability that the contents of the candidate attribute pair are GPS coordinates.

Similar feature collection records may be generated for other candidate attribute pairs or groups of each target data set for which GPS analysis is to be performed in at least some embodiments, and corresponding scores may be generated by the machine learning model for each candidate attribute pair or group. Note that different statistical feature combinations may be generated in some embodiments for a given candidate attribute pair or group than are shown in FIG. 6—e.g., other metrics of correlation (or non-correlation) may be generated, one or more of the counts 648, 650, 652, 654 and 656 may not be used as features, and so on. In at least one embodiment, at least a subset of the statistical features that are to be used as input for the machine learning model may be indicated by clients of an SDDS similar to SDDS 102 of FIG. 1 via programmatic interfaces.

Example Programmatic Interactions

Figure 7:
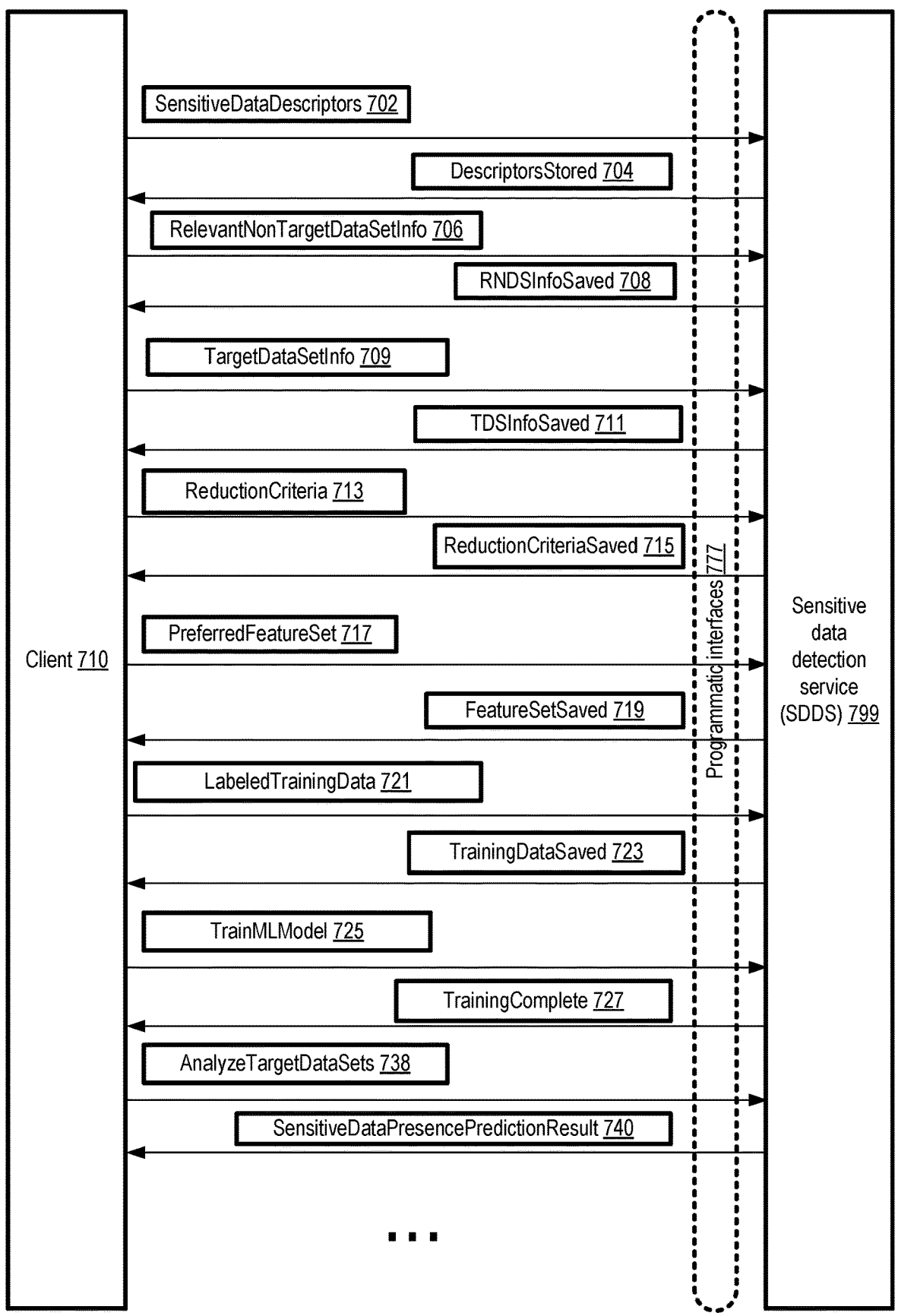
FIG. 7 illustrates example programmatic interactions pertaining to detection of sensitive data, according to at least some embodiments.

FIG. 7 illustrates example programmatic interactions pertaining to detection of sensitive data, according to at least some embodiments. SDDS 799, similar in functionality to SDDS 102 of FIG. 1, may implement one or more programmatic interfaces 777 in the depicted embodiment such as web-based consoles, command-line tools, APIs, graphical user interfaces or the like. Using the programmatic interfaces 777, a client 710 of the SDDS 799 may submit a SensitiveDataDescriptors message 702 indicating various properties of sensitive data which is to be detected in target data sets on behalf of the client, such as the data types (e.g., pairs of real numbers or floating point values in the case of GPS coordinates), valid ranges (e.g., valid latitude and longitude ranges in the case of GPS coordinates), semantic information (such as the fact that latitude and longitude both have to be specified together, that latitude and longitude values are usually not similar to one another, that GPS coordinate counts for a given region are likely to be coordinated with human population density for that region) and so on. The SDDS may store the sensitive data descriptors and send a DescriptorsStored message 704 to the client in some embodiments.

In at least one embodiment, a client 710 may provide relevant non-target data sets (i.e., prior or pre-existing data sets which can be helpful for detecting sensitive data within target data sets), such as the population density data sets discussed above, via one or more RelevantNonTargetData-SetInfo messages 706. In some cases, the client 710 may provide information about one or more authoritative sources of the relevant non-target data sets instead of providing the non-target data sets themselves, and the SDDS 799 may obtain the data from such sources. In some embodiments, the client may also provide details such as how the relevant non-target data set should be processed—e.g., preferred sizes of the cells of the 2-dimensional grids used for GPS coordinate analysis may be indicated in the RelevantNon-TargetDataSetInfo messages 706. The SDDS may save the provided information regarding the non-target data sets and send an RNDSInfoSaved message 708 in the depicted embodiment.

Information about the target data sets which are to be analyzed for the presence of sensitive data may be provided via one or more TargetDataSetInfo messages 709 in the depicted embodiment. Such information may, for example, indicate the names or identifiers of database instances, file systems, or other storage objects in which the target data sets are stored and (if needed) the credentials needed to access the target data sets. A TDSInfoSaved message 711 may be sent by the SDDS 799 to acknowledge that information about the target data sets has been saved.

In some embodiments, a client 710 may send a ReductionCriteria message 713 indicating one or more sampling rules to be used to select/filter a subset of records and/or attributes of large target data sets—e.g., whether random sampling is to be used for records, whether weighted sampling is to be used for records (with specified weights associated with respective specified subsets of the target data sets), the kinds of semantic filtering (analogous to the semantic filtering techniques discussed in the context of FIG. 5) to be used for reducing the number of attributes to be analyzed, and so on. In response, the SDDS may save the reduction criteria information and send a ReductionCriteriaSaved message 715 to the client in some embodiments.

A client 710 may provide an indication, in the form of a PreferredFeatureSet message 717, of the features (similar to the statistical feature set 632 discussed in the context of FIG. 6) to be generated from candidate attribute groups of a target data set for sensitive data analysis in at least some embodiments. Information about the feature set, such as the particular correlation metrics to be generated, may be stored at the SDDS and a FeatureSetSaved response message 719 may be sent to the clients in some embodiments.

In at least one embodiment, a client 710 may provide a labeled training data set for the machine learning model to be used to predict probabilities of the presence of sensitive data within target data sets, e.g., via one or more LabeledTrainingData messages 721. In response, the training data may be stored and a TrainingDataSaved message 723 may be sent to the client from the SDDS 799.

A client 710 may request that a machine learning model to be used for generating the probabilities of sensitive data presence be trained in some embodiments, by sending a TrainMLModel request 725 to the SDDS 799. Respective models may be trained for different categories of sensitive data in some embodiments, using respective sets of training data, and the client may send separate training requests (as well as other messages shown in FIG. 7) for each category of sensitive data to be detected automatically. After the training of a model is complete, the SDDS may send a TrainingComplete message 727 to the client in the depicted embodiment.

An AnalyzeTargetDataSets request 738 may be submitted by a client in some embodiments to obtain, corresponding to one or more target data sets, a respective score indicative of the probability of the presence of sensitive data of a specified category, as predicted by a trained version of the corresponding machine learning model. In response to the AnalyzeTargetDataSets request, in various embodiments specific structured data objects to be analyzed may be identified, and the above-described workflow of sampling, obfuscating raw values, filtering attribute candidates, generating feature sets, and obtaining probabilities from the machine learning model may be initiated. One or more SensitiveDataPresencePredictionResult messages 740 may be provided in response to the AnalyzeTargetDataSets request, indicating the results (e.g., a score indicative of a probability of the presence of sensitive data) produced by the models for the data sets. In at least some embodiments, in addition to simply providing an indication of the predicted probability (or a binary classifier result indicating whether the target does or does not contain sensitive data), the names or identifiers of various attributes or data objects (e.g., table names and column names within tables) that are predicted to contain the sensitive data may also be provided if the predicted probability exceeds a threshold.

In some embodiments, a different combination of programmatic interactions pertaining to sensitive data presence analysis may be supported than those shown in FIG. 7. For example, programmatic interactions may be used by clients to specify resource constraints for doing the analysis, to request scheduled analysis (e.g., once every T hours or days) as the target data store contents changes, to indicate other hyper-parameters of the sensitive data presence prediction procedure such as the type of machine learning model to be used, the loss functions of the model, and so on.

Example Provider Network Environment

Figure 8:
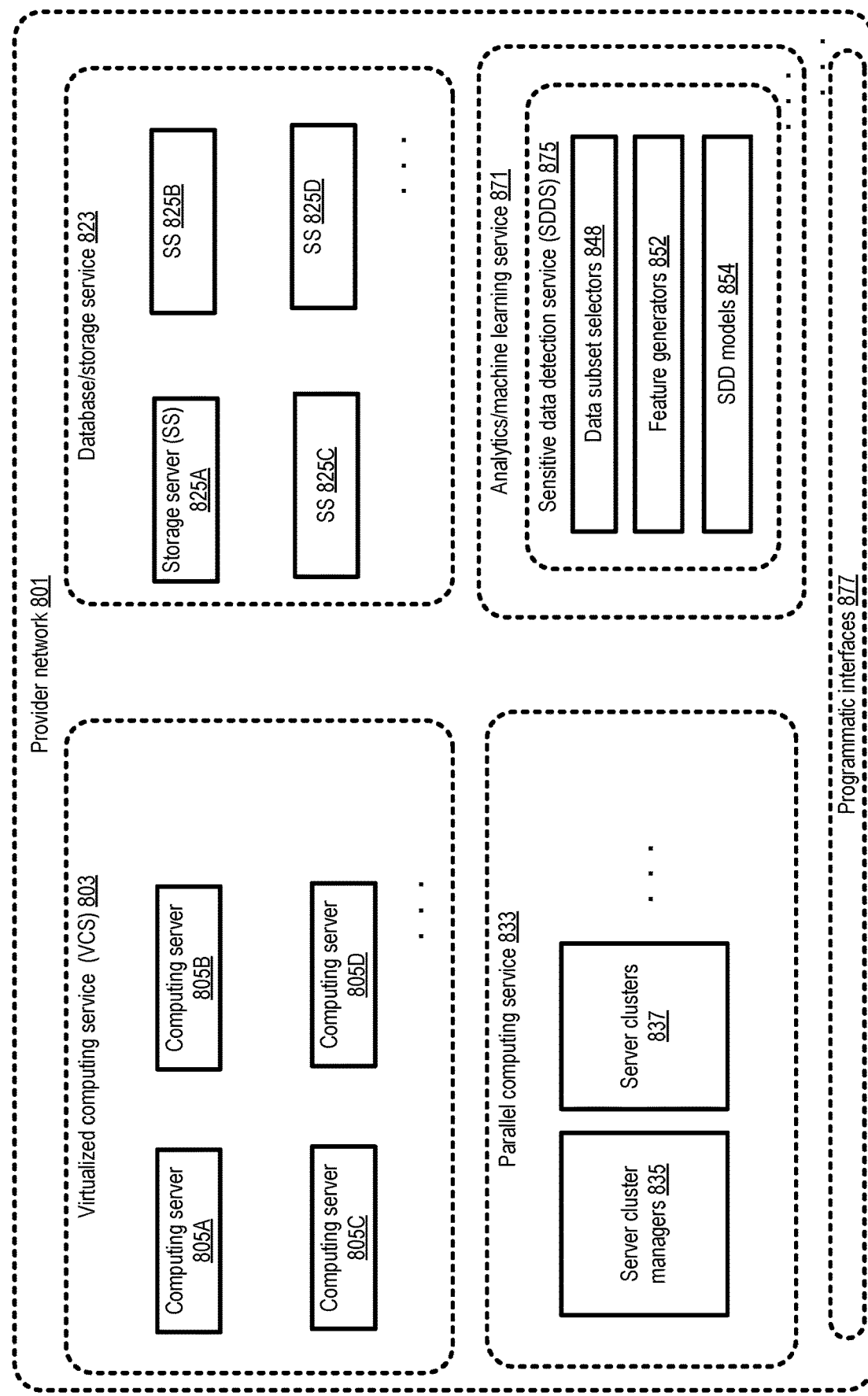
FIG. 8 illustrates an example provider network environment in which a sensitive data detection service may be implemented, according to at least some embodiments.

In some embodiments, as mentioned earlier, an analytics service at which content analysis techniques similar to those described above may be implemented at a provider network FIG. 8 illustrates an example provider network environment in which a sensitive data detection service may be implemented, according to at least some embodiments. In the depicted embodiment, provider network 801 may comprise resources used to implement a plurality of services, including for example a virtualized computing service (VCS) 803, a database/storage service 823, and a parallel computing service 833 as well as an analytics/machine learning service 871 within which an SDDS 875 similar in functionality to SDDS 102 of FIG. 1 may be implemented. The SDDS 875 in turn may comprise data subset selectors 848, feature generators 852 and one or more sensitive data detection (SDD) models 854. The parallel computing service 833 may comprise various server clusters 837, each comprising a plurality of servers, on which parallelizable workloads may be distributed by a set of server cluster managers 835 in the depicted embodiment. Some of the algorithms implemented at the SDDS 875 may be parallelizable, and may utilize the server clusters 837 in at least some embodiments.

Components of a given service may utilize components of other services in the depicted embodiment—e.g., for some analytics service tasks, virtual machines implemented at computing servers such as 805A-805D of the virtualized computing service 803 may be used, server clusters 837 and/or cluster managers 835 may be utilized for parallelizable computations of the analytics service, input data (e.g., target data sets) and/or output produced at the analytics service may be stored at storage servers 825 (e.g., 825A-825D) of storage service 823, and so on. Individual ones of the services shown in FIG. 8 may implement a respective set of programmatic interfaces 877 which can be used by external and/or internal clients (where the internal clients may comprise components of other services) in the depicted embodiment.

In some embodiments, at least some aspects of the sensitive data detection techniques described herein may be implemented without acquiring resources of network-accessible services such as those shown in FIG. 8. For example, a standalone tool implemented at one or more computing devices which are not part of a network-accessible service may be used in one embodiment.

Methods for Efficient Statistical Detection of Sensitive Data

Figure 9:
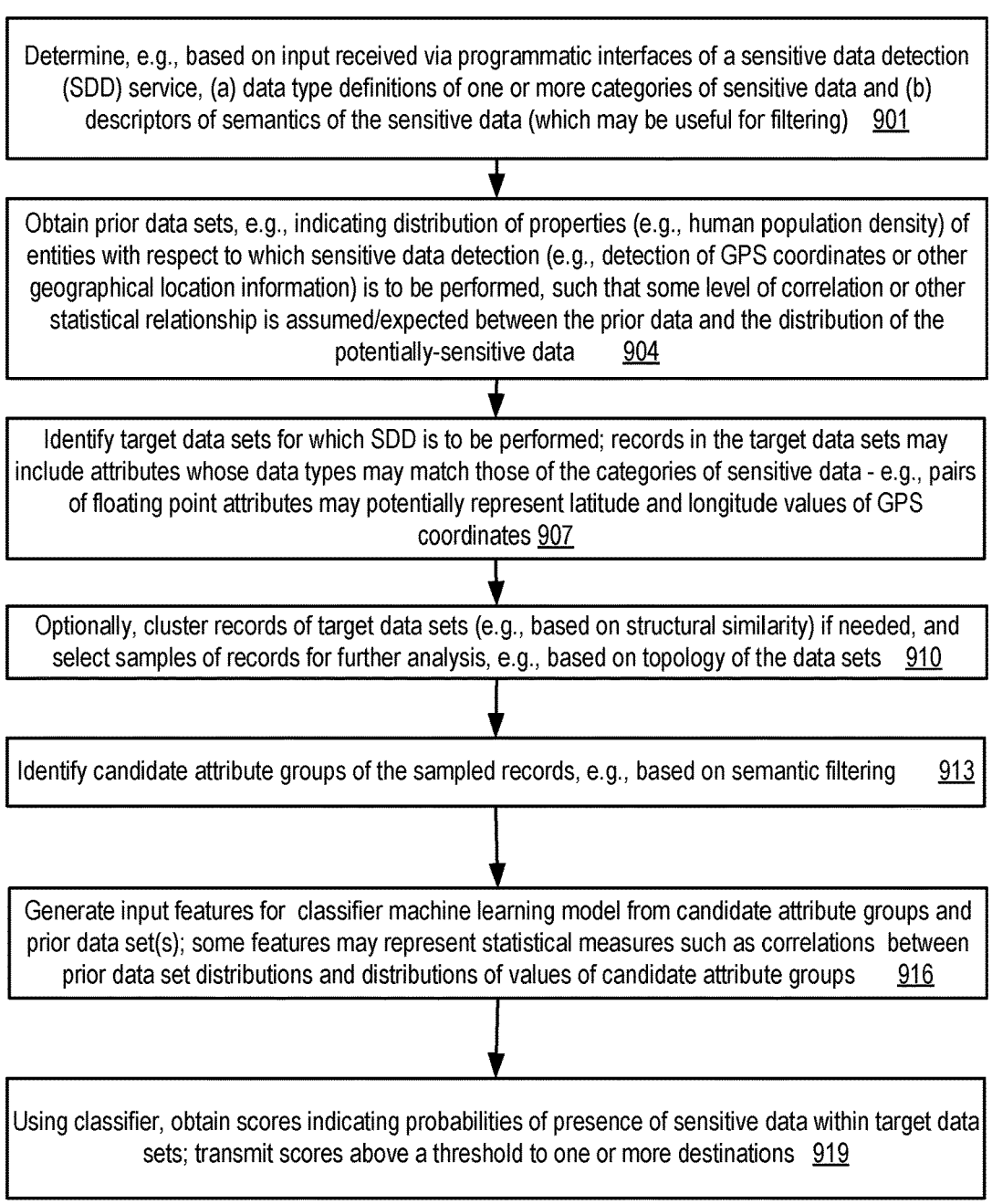
FIG. 9 is a flow diagram illustrating aspects of operations that may be performed to detect sensitive information within data stores, according to at least some embodiments.

FIG. 9 is a flow diagram illustrating aspects of operations that may be performed to detect sensitive information within data stores, according to at least some embodiments. As shown in element 901, data type definitions (which may also be referred to as entity type definitions) of one or more categories of sensitive data whose presence is to be detected within specified data stores may be determined, e.g., based on input received via programmatic interfaces of a sensitive data detection service (SDDS). In addition, in at least some embodiments, indicators or descriptors of semantic information pertaining to the sensitive data (such as valid ranges or values, probability of similarities/correlations between different dimensions of multidimensional sensitive data, etc.) which may be useful for filtering of candidate attributes of records of the target data sets may also be obtained.

One or more prior pre-existing non-target data sets which can be used to assist in the detection of at least some categories of sensitive data within the target data sets may also be obtained in various embodiments (element 904). These prior data sets may, for example, indicate a distribution of one or more properties (e.g., human population density in a scenario in which the sensitive data comprises GPS coordinates) of the entities with respect to which the sensitive data detection is to be performed, such that some level of correlation or other statistical relationship (such as anti-correlation or negative correlation) is assumed/expected between the prior data and the distribution of the potentially-sensitive data.

The specific target data sets (e.g., comprising one or more database tables, files, spreadsheets, etc., of one or more data stores) on which sensitive data detection is to be performed may be identified (element 907) in the depicted embodiment. The data sets may comprise structured records in at least some embodiments, where attributes/fields/columns of at least some of the records may have data types which match (or can easily be mapped to) the data types of the sensitive data categories. For example, if the target data sets are to be analyzed for the possible presence of GPS coordinates expressed as a pair of floating point numbers (one for latitude, another for longitude), records which contain at least two real number attributes may be candidates for further analysis.

Optionally, in at least some embodiments, records of the target data sets may be clustered (subdivided into groups), e.g., based on structural similarity or other factors (element 910) in some embodiments if needed. Samples of the records may be selected for further analysis in various embodiments, e.g., based on the topology of the data stores/sets, so that a representative subset can be analyzed instead of analyzing the entire data sets.

Candidate attribute groups (e.g., pairs of attributes with floating point values in the case of GPS coordinate detection) may be identified from the sampled records in the depicted embodiment (element 913). Semantic filters conceptually similar to those discussed in the context of FIG. 5 may be used in some embodiments to eliminate some attributes as unsuitable for further analysis.

From the candidate attribute groups and the non-target prior data, input features for a classifier or other machine learning model may be generated (element 916) in various embodiments. In at least one embodiment, one or more of the features may represent statistical measures such as correlations computed between the non-target data sets and the distributions of values in the candidate attribute groups. The machine learning model may be trained, e.g., in a preliminary step, using a labeled collection of feature records in various embodiments.

Using the classifier or other model, scores indicating the probabilities of presence of sensitive data within the target data sets may be generated (element 919). If the score for a given target data set exceeds a threshold, one or more actions may be initiated in the depicted embodiment, including for example sending notifications to one or more destinations, initiating automated security enhancement operations such as encryption or isolation of the data which is suspected to include the sensitive information. In some embodiments, the actions may include submitting a programmatic request to an owner of the target data set(s) to check/verify the presence of the targeted information and provide a result of the check so that a record of the presence of the sensitive data can be kept, submitting a request to the owner of the target data set(s) to approve an administrative action (such as locking, encryption or deletion) with respect to the target data sets. In at least one embodiment, the owner of the target data set(s) may pre-approve actions to be taken automatically if the probability of the existence of sensitive data is high: e.g., automatically isolating of at least a portion of the target data set, automatically deleting at least a portion of the target data, and so on.

As mentioned earlier, in some embodiments, in addition to or instead of providing an indication of a probability that a given data set includes sensitive data, additional details regarding exactly where (e.g., which attributes of which table, or which previously-identified cluster, etc.) within the data set the sensitive data is suspected to exist may also be provided. Such details may help data owners/administrators more quickly verify the presence of the sensitive data and initiate responsive actions in various embodiments. In at least some embodiments, if the presence of sensitive data is verified (or if the data set owner examines the data and concludes that it does not in fact contain sensitive data), this feedback can be used to improve the machine learning model used to generate the probabilities. For example, based on such feedback, additional training data may be generated and the model may be periodically retrained.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Use Cases

The techniques described above, of using statistical techniques to predict the probability of the presence of sensitive data such as GPS coordinates within various target data sets using pre-existing non-target data sets with which the sensitive data is assumed to have statistical relationships, may be useful in a variety of scenarios. For example, such techniques may be used to assist in compliance with privacy related regulations and/or policies at cloud-based storage services or database services at which very large amounts of data are accumulated on an ongoing basis. Transformation/obfuscation techniques used before the statistical features are generated from the target data sets may ensure that the sensitive data (if it exists) is not copied during the sensitive data presence detection analysis, and semantics-based filtering techniques may help ensure that only a relevant subset of the target data sets are analyzed instead of the entire data sets.

Illustrative Computer System

Figure 10:
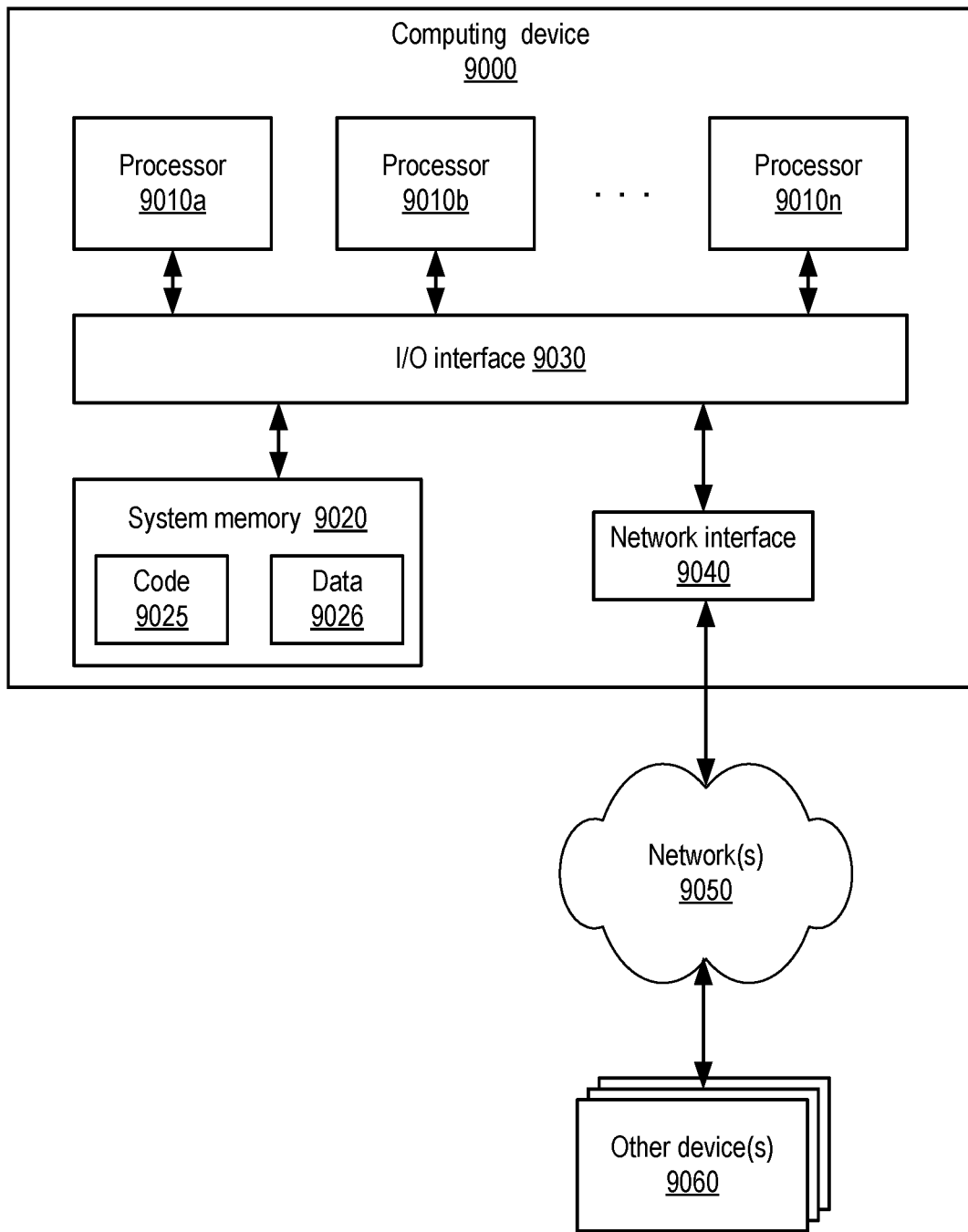
FIG. 10 is a block diagram illustrating an example computing device that may be used in at least some embodiments.

In at least some embodiments, a server that implements the types of techniques described herein (e.g., various functions of a sensitive data detection service or other services of a provider network), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   obtaining, at a cloud computing environment via one or more programmatic interfaces, (a) an indication of a at least a first type of sensitive data for whose presence a target data set is to be analyzed, wherein the target data set comprises a plurality of data objects and (b) a sensitive data presence probability threshold for determining whether to initiate an automated action;
   predicting, at the cloud computing environment, a probability that a particular data object of the target data set includes the first type of sensitive data; and
   in response to detecting that the probability exceeds the sensitive data presence probability threshold, initiating the automated action by the cloud computing environment.

2. The computer-implemented method as recited in claim 1, wherein the automated action comprises one or more of: (a) generation of a notification, (b) a submission of a request to an owner of the target data set to verify presence of the first type of sensitive data in the target data set, (c) a submission of a request to an owner of the target data set to approve an administrative action with respect to the target data set, (d) isolation of at least a portion of the target data set, (e) encryption of at least a portion of the target data set, or (f) a deletion of at least a portion of the target data set.

3. The computer-implemented method as recited in claim 1, wherein the first type of sensitive data comprises one or more of: (a) geographical location data, (b) an identifier of a customer account, an individual, a device or an order, (c) an Internet Protocol (IP) address, (d) an email address, (e) a phone number, (f) financial data, (g) a birth date, or (h) data indicating one or more contacts of an individual.

4. The computer-implemented method as recited in claim 1, further comprising:
   performing, prior to predicting the probability, a transformation operation to obfuscate at least a portion of the particular data object.

5. The computer-implemented method as recited in claim 1, wherein individual ones of the plurality of data objects comprise a plurality of attributes, the computer-implemented method further comprising:
   obtaining, at the cloud computing environment via the one or more programmatic interfaces, an indication of a filtering rule to be applied to select an attribute of the plurality of attributes which is to be analyzed to predict the probability of presence of the first type of sensitive data, wherein the probability that the particular data object includes the first type of sensitive data is predicted based at least in part on analysis of a particular attribute selected using the filtering rule.

6. The computer-implemented method as recited in claim 1, wherein said predicting the probability comprises:
   utilizing a machine learning model.

7. The computer-implemented method as recited in claim 6, further comprising:
   obtaining, at the cloud computing environment via the one or more programmatic interfaces, a labeled training data set for the machine learning model; and
   training, at the cloud computing environment, the machine learning model using the labeled training data set.

8. A system, comprising:
   one or more computing devices;
   wherein the one or more computing devices include instructions that upon execution on or across the one or more computing devices:

obtain, at a cloud computing environment via one or more programmatic interfaces, (a) an indication of a at least a first type of sensitive data for whose presence a target data set is to be analyzed, wherein the target data set comprises a plurality of data objects and (b) a sensitive data presence probability threshold for determining whether to initiate an automated action;

predict, at the cloud computing environment, a probability that a particular data object of the target data set includes the first type of sensitive data; and initiate the automated action by the cloud computing environment in response to detecting that the probability exceeds the sensitive data presence probability threshold.

9. The system as recited in claim 8, wherein the automated action comprises one or more of: (a) generation of a notification, (b) a submission of a request to an owner of the target data set to verify presence of the first type of sensitive data in the target data set, (c) a submission of a request to an owner of the target data set to approve an administrative action with respect to the target data set, (d) isolation of at least a portion of the target data set, (e) encryption of at least a portion of the target data set, or (f) a deletion of at least a portion of the target data set.

10. The system as recited in claim 8, wherein the first type of sensitive data comprises one or more of: (a) geographical location data, (b) an identifier of a customer account, an individual, a device or an order, (c) an Internet Protocol (IP) address, (d) an email address, (e) a phone number, (f) financial data, (g) a birth date, or (h) data indicating one or more contacts of an individual.

11. The system as recited in claim 8, wherein the one or more computing devices include further instructions that upon execution on or across the one or more computing devices:

perform, prior to predicting the probability, a transformation operation to obfuscate at least a portion of the particular data object.

12. The system as recited in claim 8, wherein individual ones of the plurality of data objects comprise a plurality of attributes, and wherein the one or more computing devices include further instructions that upon execution on or across the one or more computing devices:

obtain, at the cloud computing environment via the one or more programmatic interfaces, an indication of a filtering rule to be applied to select an attribute of the plurality of attributes which is to be analyzed to predict the probability of presence of the first type of sensitive data, wherein the probability that the particular data object includes the first type of sensitive data is predicted based at least in part on analysis of a particular attribute selected using the filtering rule.

13. The system as recited in claim 8, wherein to predict the probability, the one or more computing devices include further instructions that upon execution on or across the one or more computing devices:

utilize a machine learning model.

14. The system as recited in claim 13, wherein the one or more computing devices include further instructions that upon execution on or across the one or more computing devices:

obtain, at the cloud computing environment via the one or more programmatic interfaces, a labeled training data set for the machine learning model; and train, at the cloud computing environment, the machine learning model using the labeled training data set.

15. One or more non-transitory computer-accessible storage media storing program instructions that when executed on or across one or more processors:

obtain, at a cloud computing environment via one or more programmatic interfaces, (a) an indication of a at least a first type of sensitive data for whose presence a target data set is to be analyzed, wherein the target data set comprises a plurality of data objects and (b) a sensitive data presence probability threshold for determining whether to initiate an automated action;

predict, at the cloud computing environment, a probability that a particular data object of the target data set includes the first type of sensitive data; and initiate the automated action by the cloud computing environment in response to detecting that the probability exceeds the sensitive data presence probability threshold.

16. The one or more non-transitory computer-accessible storage media as recited in claim 15, wherein the automated action comprises one or more of: (a) generation of a notification, (b) a submission of a request to an owner of the target data set to verify presence of the first type of sensitive data in the target data set, (c) a submission of a request to an owner of the target data set to approve an administrative action with respect to the target data set, (d) isolation of at least a portion of the target data set, (e) encryption of at least a portion of the target data set, or (f) a deletion of at least a portion of the target data set.

17. The one or more non-transitory computer-accessible storage media as recited in claim 15, wherein the first type of sensitive data comprises one or more of: (a) geographical location data, (b) an identifier of a customer account, an individual, a device or an order, (c) an Internet Protocol (IP) address, (d) an email address, (e) a phone number, (f) financial data, (g) a birth date, or (h) data indicating one or more contacts of an individual.

18. The one or more non-transitory computer-accessible storage media as recited in claim 15, storing further program instructions that when executed on or across the one or more processors:

perform, prior to predicting the probability, a transformation operation to obfuscate at least a portion of the particular data object.

19. The one or more non-transitory computer-accessible storage media as recited in claim 15, wherein individual ones of the plurality of data objects comprise a plurality of attributes, the one or more non-transitory computer-accessible storage media storing further program instructions that when executed on or across the one or more processors:

obtain, at the cloud computing environment via the one or more programmatic interfaces, an indication of a filtering rule to be applied to select an attribute of the plurality of attributes which is to be analyzed to predict the probability of presence of the first type of sensitive data, wherein the probability that the particular data object includes the first type of sensitive data is predicted based at least in part on analysis of a particular attribute selected using the filtering rule.

20. The one or more non-transitory computer-accessible storage media as recited in claim 19, wherein to predict the probability, the one or more non-transitory computer-accessible storage media store further program instructions that when executed on or across the one or more processors:

utilize a machine learning model.

* * * * *